(12) United States Patent
Lemley et al.

(10) Patent No.: US 11,936,805 B2
(45) Date of Patent: Mar. 19, 2024

(54) AUTOMATE—AUTOMATED INTERFACE BETWEEN CALL CENTER AGENTS AND NETWORK ORCHESTRATION SYSTEMS VIA APPLICATION PROGRAMMING INTERFACES (APIs)

(71) Applicant: CenturyLink Intellectual Property LLC, Broomfield, CO (US)

(72) Inventors: Jaime D. Lemley, Apopka, FL (US); Rob Preston, Mechanicsburg, PA (US); Jeremy Lemley, Apopka, FL (US)

(73) Assignee: CentryLink Intellectual Property LLC, Broomfield, CO (US)

( * ) Notice: Subject to any disclaimer, the term of this patent is extended or adjusted under 35 U.S.C. 154(b) by 136 days.

(21) Appl. No.: 17/491,196

(22) Filed: Sep. 30, 2021

(65) Prior Publication Data

US 2023/0048667 A1 Feb. 16, 2023

Related U.S. Application Data

(60) Provisional application No. 63/231,583, filed on Aug. 10, 2021.

(51) Int. Cl.
| | |
|---|---|
| *H04M 3/22* | (2006.01) |
| *H04L 51/02* | (2022.01) |
| *H04M 3/42* | (2006.01) |
| *H04M 3/51* | (2006.01) |
| *G06F 3/0482* | (2013.01) |
| *H04L 41/22* | (2022.01) |

(52) U.S. Cl.
CPC .......... *H04M 3/2272* (2013.01); *H04L 51/02* (2013.01); *H04M 3/2263* (2013.01); *H04M 3/4217* (2013.01); *H04M 3/5191* (2013.01); *G06F 3/0482* (2013.01); *H04L 41/22* (2013.01)

(58) Field of Classification Search
None
See application file for complete search history.

(56) References Cited

U.S. PATENT DOCUMENTS 6,823,479 B1 * 11/2004 McElhaney, Jr. ... H04L 41/0631
714/4.2
7,818,283 B1 * 10/2010 Bajpay ................ H04L 43/0817
707/E17.005

(Continued)

*Primary Examiner* — Quoc D Tran

(57) ABSTRACT

Novel tools and techniques are provided for implementing call center-based automated interface between call center agents and network orchestration systems, in some cases, via application programming interfaces ("APIs"). In various embodiments, an automated services platform may collect, from data sources, data associated with services provided by a service provider. The collected data may be autonomously analyzed to identify any issues with provisioning a service(s) to a customer. If so, one or more automation actions may be autonomously identified to address the determined issue(s). The automated services platform may autonomously send instructions to automation bots to perform the identified one or more automation actions, and may generate and present a UI on a user terminal operated by a user, the UI displaying information regarding at least one of the at least one issue, the affected service(s), the identified one or more automation actions, or the automation bots, and/or the like.

20 Claims, 18 Drawing Sheets

(56) References Cited

U.S. PATENT DOCUMENTS

| | | | |
|---|---|---|---|
| 2006/0227714 A1* | 10/2006 | Griffin | H04L 43/50 370/241 |
| 2009/0034411 A1* | 2/2009 | Bernard | H04Q 11/0067 370/221 |
| 2016/0301566 A1* | 10/2016 | Ramasubramani | H04L 41/0813 |
| 2019/0238403 A1* | 8/2019 | Wang | G06F 8/65 |
| 2022/0116793 A1* | 4/2022 | Osinski | H04M 15/41 |

* cited by examiner

Edit Process

| Bot Info | Status/Setup | Orcha/Server | Benefit | Fields | Rules |

*denotes required fields*

Bot ID
20

Bot Name *
Re-Enable PPPoE Login

Bot Description *
Re-Enable Workflow PPPoE Credentials

Market *
CRIS ∨

Type *
uipath ∨

Impacts
Network ∨

Category *
Troubleshooting ∨

Comments

[Submit]  [Cancel]

Fig. 3B

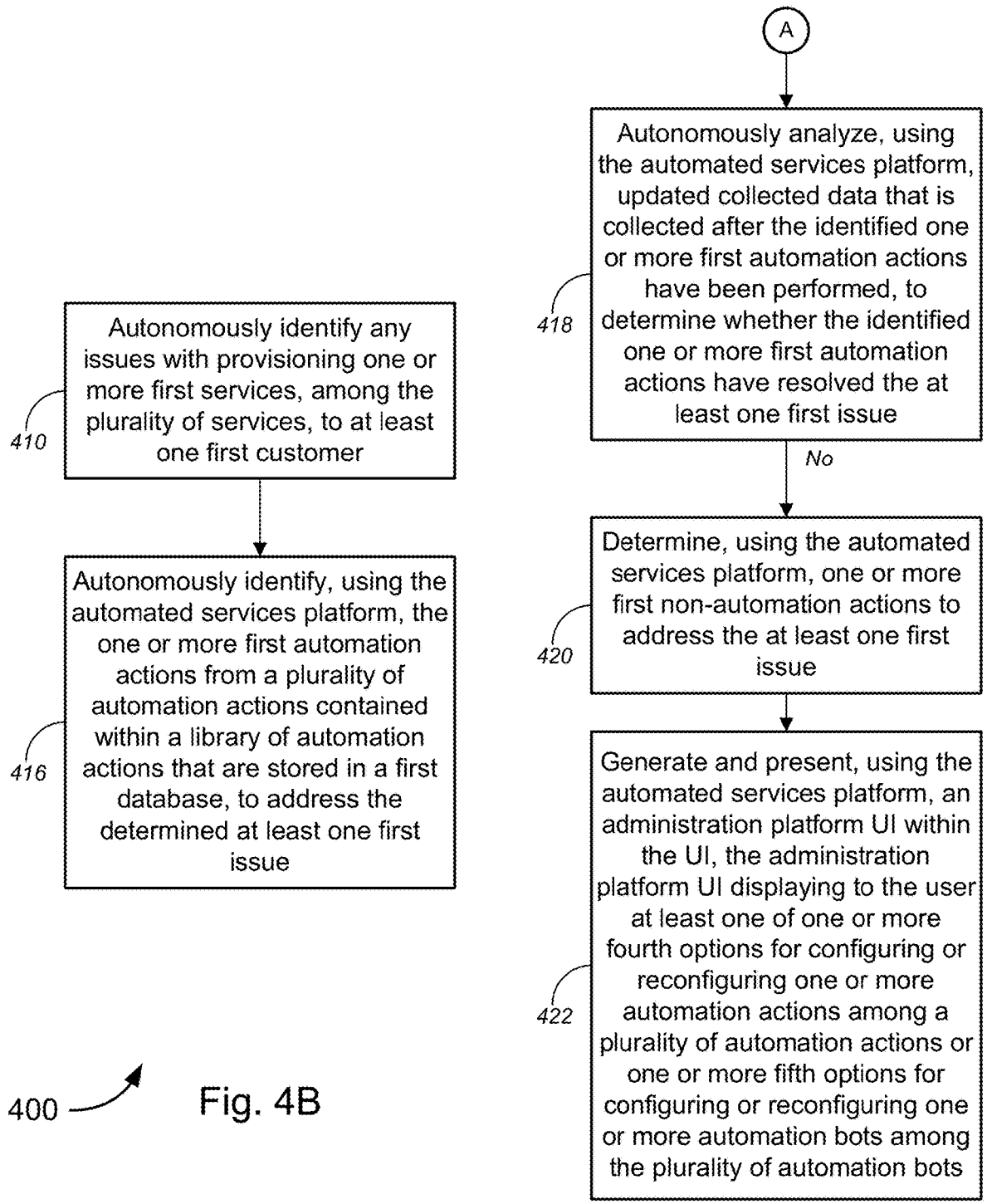

400

AUTOMATE—AUTOMATED INTERFACE BETWEEN CALL CENTER AGENTS AND NETWORK ORCHESTRATION SYSTEMS VIA APPLICATION PROGRAMMING INTERFACES (APIs)

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing service diagnostics and provisioning, and, more particularly, to methods, systems, and apparatuses for implementing call center-based automated interface between call center agents and network orchestration systems, in some cases, via application programming interfaces ("APIs") (also referred to herein as "autoMate").

BACKGROUND

Conventional call centers (especially ones that support voice services, Internet service, or the like) typically do not provide call center agents with the ability to see all aspects of services provided to a customer, much less provide such agents with the ability to fix mal-functioning or non-functioning features of such services. For instance, conventional call center systems have no direct access to billing systems, and thus do not provide call center agents with billing information without significant (and at times, time consuming) effort on the part of the agents. Further, conventional call center systems do not have access to the switches providing the voice services and/or the network switches providing the Internet services. In most cases, conventional call center agents must initiate a truck roll to dispatch field technicians to the customer premises, or the affected switches or network switches, or the like. Moreover, as there are no established systems and processes in place in conventional call centers, response to customer calls for help may differ from call center agent to call center agent, resulting in inconsistent (and in some cases, ineffectual) results and responses to the customer issues.

Further, conventional service diagnostics and provisioning systems lack automation functionalities to autonomously address service issues in the network, which necessitates truck rolls to dispatch field technicians, even for relatively simple fixes, thereby increasing costs, decreasing response times, and lowering customer satisfaction.

Hence, there is a need for more robust and scalable solutions for implementing service diagnostics and provisioning, and, more particularly, to methods, systems, and apparatuses for implementing call center-based automated interface between call center agents and network orchestration systems, in some cases, via application programming interfaces ("APIs").

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 3A-3J are schematic diagrams illustrating various non-limiting examples of user interfaces ("UIs") may be used when implementing call center-based automated interface between call center agents and network orchestration systems, in accordance with various embodiments.

FIGS. 4A-4E are flow diagrams illustrating a method for implementing call center-based automated interface between call center agents and network orchestration systems, in accordance with various embodiments.

DETAILED DESCRIPTION OF CERTAIN EMBODIMENTS

Overview

Figure 1:
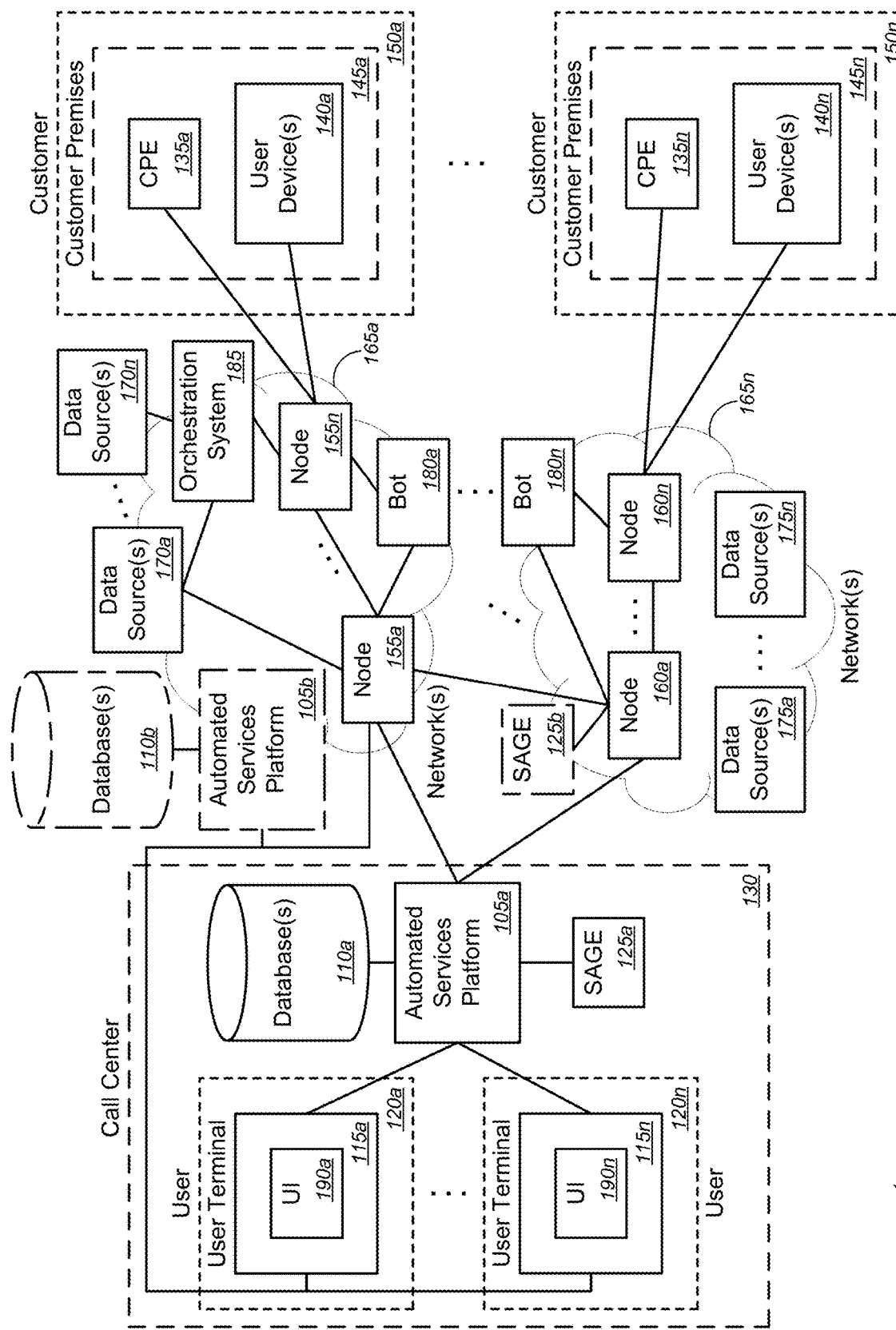
FIG. 1 is a schematic diagram illustrating a system for implementing call center-based automated interface between call center agents and network orchestration systems, in accordance with various embodiments.

Various embodiments provide tools and techniques for implementing service diagnostics and provisioning, and, more particularly, to methods, systems, and apparatuses for implementing call center-based automated interface between call center agents and network orchestration systems, in some cases, via application programming interfaces ("APIs").

In various embodiments, an automated services platform may collect data from each of a plurality of data sources, the collected data being associated with a plurality of services provided by a service provider. The collected data may be autonomously analyzed to identify any issues with provisioning one or more first services, among the plurality of services, to at least one first customer. Based on a determination that at least one first issue affects provisioning of at least one first service among the one or more first services, one or more first automation actions may be autonomously identified to address the determined at least one first issue. The automated services platform may autonomously send one or more first instructions to one or more first automation bots, among a plurality of automation bots, to perform the identified one or more first automation actions, and may generate and present a UI on a user terminal associated with or operated by a user. In some cases, the UI may display information regarding at least one of the at least one first issue, the at least one first service affected by the at least one first issue, the identified one or more first automation actions for addressing the at least one first issue, or the one or more first automation bots for performing the one or more first automation actions, and/or the like.

In some embodiments, autonomously identifying the one or more first automation actions to address the determined at least one first issue may comprise the automated services platform autonomously identifying the one or more first automation actions from a plurality of automation actions contained within a library of automation actions that are stored in a first database, to address the determined at least one first issue.

In some instances, autonomously analyzing the collected data to identify any issues with provisioning the one or more first services to the at least one first customer and autonomously identifying the one or more first automation actions to address the determined at least one first issue may comprise: the automated services platform sending the collected data to a service action guidance engine ("SAGE"); the service action guidance engine autonomously analyzing the collected data to identify any issues with provisioning one or more first services, among the plurality of services, to the at least one first customer; the service action guidance engine autonomously identifying the one or more first automation actions from a plurality of automation actions contained within a library of automation actions that are stored in a database, to address the determined at least one first issue; and the service action guidance engine sending the identified one or more first automation actions to the automated services platform; and/or the like.

According to some embodiments, the automated services platform may manage connections, and may communicate, with each of the plurality of data sources and with each of the plurality of automation bots, the plurality of data sources and the plurality of automation bots being disposed within one or more networks providing the one or more first services. In some instances, at least one data source may comprise at least one automation bot. In some cases, managing connections, and communicating, with each of the plurality of data sources may be performed via a first application programming interface ("API") between the automated services platform and each of the plurality of data sources. In some instances, managing connections, and communicating, with each of the plurality of automation bots may be performed via a second API between the automated services platform and each of the plurality of automation bots.

In some embodiments, collecting data from each of the plurality of data sources may comprise collecting data from each of the plurality of data sources via an orchestration system, and autonomously sending the one or more first instructions to the one or more first automation bots may comprise autonomously sending the one or more first instructions to the one or more first automation bots via the orchestration system. In such cases, the first API may communicatively couple the orchestration system with each of the plurality of data sources, and the second API may communicatively couple the orchestration system with each of the plurality of automation bots, while a third API may communicatively couple the orchestration system with the automated services platform, and a fourth API may communicatively couple the automated services platform with the user terminal. In some instances, the automated services platform may monitor and track success rates and failure rates of each of the plurality of automation bots based at least in part on analysis of one or more of updated collected data or data directly collected from each of the plurality of automation bots.

In alternative aspects, a call center-based automated interface between a call center user and a network orchestration system may comprise a user terminal associated with a call center user who is associated with a service provider; a plurality of data sources that provide data associated with a plurality of services provided by the service provider; a plurality of automation bots configured to perform automation actions related to provisioning of the plurality of services; an orchestration system configured to collect data from the plurality of data sources and configured to control the plurality of bots to perform the automation actions; and an automated services platform configured to establish and manage a first communications link between the automated services platform and the user terminal and configured to establish and manage a second communications link between the automated services platform and the orchestration system, where the first and second communications links may include at least one API that serves at least in part as a bridge between the user terminal and each of the plurality of automation bots.

In the various embodiments, the call center-based automated interface between call center agents and network orchestration systems (in some cases, via APIs) may provide a uniform access to most, if not all, aspects of a majority (if not all) of the services provided to the customer and/or the service customer account, and to integrate all accessed information within a UI presented and displayed to the call service user or agent. In some cases, the call center-based automated interface may autonomously access a plurality of disparate data sources containing information regarding the services provided to the customer and/or information regarding the customer account, and may autonomously determine and initiate automation actions to address issues arising from provisioning of at least one of the services provided to the customer. As such, in most cases, truck rolls (i.e., dispatching field technicians, etc.) may be avoided, while quickly and efficiently addressing customer issues, resulting in better service to the customer and greater customer satisfaction. In some aspects, the automated services platform may serve as a platform that is interactive for the end-user and that manages connections and communications with automations or automation bots, thereby creating a bridge between the numerous automations or automation bots and the end-user. The automated services functionality is exposed to the end-user via a single API that controls all of the automation functions.

These and other aspects of the call center-based automated interface with voice switches for voice service diagnostics and provisioning are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, service diagnostics technology, service provisioning technology, service diagnostics and provisioning technology, service management technology, call center technology, and/or the like. In other aspects, certain embodiments, can improve the functioning of user equipment or systems themselves (e.g., service diagnostics systems, service provisioning systems, service diagnostics and provisioning systems, service management systems, call center systems, etc.), for example, by, collecting, using an automated services platform, data from each of a plurality of data sources, the collected data being associated with a plurality of services provided by a service provider; autonomously analyzing the collected data to identify any issues with provisioning one or more first services, among the plurality of services, to at least one first customer; based on a determination that at least one first issue affects provisioning of at least one first service among the one or more first services, autonomously identifying one or more first automation actions to address the determined at least one first issue; autonomously sending, using the automated services platform, one or more first instructions to one or more first automation bots, among a plurality of automation bots, to perform the identified one or more first automation actions; and generating and presenting, using the automated services platform, a user interface ("UI") on a user terminal associated with or operated by a user, the UI displaying information regarding at least one of the at least one first issue, the at least one first service affected by the at least one first issue, the identified one or more first automation actions for addressing the at least one first issue, or the one or more first automation bots for performing the one or more first automation actions, and/or the like; or the like.

In particular, to the extent any abstract concepts are present in the various embodiments, those concepts can be implemented as described herein by devices, software, systems, and methods that involve specific novel functionality (e.g., steps or operations), such as, the call center-based automated interface between call center agents and network orchestration systems (in some cases, via APIs) may provide a uniform access to most, if not all, aspects of a majority (if not all) of the services provided to the customer and/or the service customer account, and to integrate all accessed information within a UI presented and displayed to the call service user or agent; autonomously collecting data regarding the services provided to the customer or regarding the customer account from the plurality of data sources; and autonomously determining and controlling one or more automation bots to perform one or more automation actions to address any issues arising from provisioning of the services provided to the customer. These functionalities can produce tangible results outside of the implementing computer system, including, merely by way of example, optimized diagnostic and provisioning of services to customers, with automated and autonomously deployment of automation bots to resolve any identified issues with provisioning of services to the customer, in most cases, obviating truck rolls (i.e., dispatching field technicians, etc.), while quickly and efficiently addressing customer issues, resulting in better service to the customer and greater customer satisfaction, and/or the like, to name a few examples, that extend beyond mere conventional computer processing operations, and/or the like, at least some of which may be observed or measured by customers and/or service providers.

In an aspect, a method may comprise collecting, using an automated services platform, data from each of a plurality of data sources, the collected data being associated with a plurality of services provided by a service provider; autonomously analyzing the collected data to identify any issues with provisioning one or more first services, among the plurality of services, to at least one first customer; based on a determination that at least one first issue affects provisioning of at least one first service among the one or more first services, autonomously identifying one or more first automation actions to address the determined at least one first issue; autonomously sending, using the automated services platform, one or more first instructions to one or more first automation bots, among a plurality of automation bots, to perform the identified one or more first automation actions; and generating and presenting, using the automated services platform, a user interface ("UI") on a user terminal associated with or operated by a user, the UI displaying information regarding at least one of the at least one first issue, the at least one first service affected by the at least one first issue, the identified one or more first automation actions for addressing the at least one first issue, or the one or more first automation bots for performing the one or more first automation actions, and/or the like.

In some embodiments, the plurality of data sources may comprise at least one of one or more network data sources, one or more network extended data sources, one or more customer data sources, or one or more customer account data sources, one or more billing data sources, one or more dispatch data sources, one or more network tools, or one or more nodes disposed in at least one network via which at least one service among the plurality of services is provisioned, and/or the like.

According to some embodiments, autonomously identifying the one or more first automation actions to address the determined at least one first issue may comprise autonomously identifying, using the automated services platform, the one or more first automation actions from a plurality of automation actions contained within a library of automation actions that are stored in a first database, to address the determined at least one first issue.

In some embodiments, determining that the at least one first issue affects provisioning of the at least one first service and identifying the one or more first automation actions to address the determined at least one first issue may comprise: comparing, using the automated services platform, the collected data with a plurality of sets of predetermined conditions stored in a second database together with corresponding plurality of automation actions; and determining, using the automated services platform, that at least one first collected data among the collected data matches at least one first set of predetermined conditions among the plurality of sets of predetermined conditions, wherein the at least one first set of predetermined conditions corresponds to the one or more first automation actions among the plurality of automation actions. In such cases, the method may further comprise: collecting, using the automated services platform, updated data from each of the plurality of data sources; comparing, using the automated services platform, at least one second collected data, among the updated data, with the at least one first set of predetermined conditions, the at least one second collected data being updated data of the at least one first collected data; and determining, using the automated services platform, whether the at least one first issue has been resolved by the one or more first automation bots based at least in part on the comparison.

Alternatively, or additionally, autonomously analyzing the collected data to identify any issues with provisioning the one or more first services to the at least one first customer and autonomously identifying the one or more first automation actions to address the determined at least one first issue may comprise: sending, using the automated services platform, the collected data to a service action guidance engine ("SAGE"); autonomously analyzing, using the SAGE, the collected data to identify any issues with provisioning one or more first services, among the plurality of services, to the at least one first customer; autonomously identifying, using the SAGE, the one or more first automation actions from a plurality of automation actions contained within a library of automation actions that are stored in a database, to address the determined at least one first issue; and sending, using the SAGE, the identified one or more first automation actions to the automated services platform.

In some instances, the collected data may comprise data associated with provisioning services to all customers of the service provider, wherein the method may further comprise: autonomously analyzing, using the SAGE, the collected data to identify at least one of any common issues, any related issues, or any widespread issues with provisioning services, among the plurality of services, to a plurality of second customers of the service provider; based on a determination that at least one second issue affects provisioning of at least one second service among the one or more second services, autonomously identifying one or more second automation actions to address the determined at least one second issue; autonomously sending, using the automated services platform, one or more second instructions to one or more second automation bots, among the plurality of automation bots, to perform the identified one or more second automation actions.

In some cases, collecting data from each of the plurality of data sources may comprise collecting data from each data source containing data directly associated with provisioning the one or more first services to the at least one first customer and from each data source containing data indirectly associated with provisioning the one or more first services. In some instances, the data indirectly associated with provisioning the one or more first services may comprise at least one of data retrieved from an outage reporting system that collects outage data associated with provisioning the one or more first services, data associated with provisioning the one or more first services that has been posted via an application programming interface ("API") call by the outage reporting system, data associated with other customers in proximity to the at least one first customer, data associated with network nodes along potential network paths configured to provision the one or more first services, or data associated with services unassociated with the one or more first services yet indicative of geographical events, natural events, or events caused by humans that are determined to have a non-zero probability of affecting provisioning of the one or more first services to the at least one first customer.

Merely by way of example, in some cases, the one or more first automation bots may comprise one of: one or more first data sources, among the plurality of data sources, that collect first data that is indicative of the at least one first issue; one or more second automation bots that are separate from the one or more first data sources that collect the first data, wherein the one or more second automation bots are identified subsequent to identifying the one or more first automation actions based on its capability of performing the identified one or more first automation actions; or one or more third automation bots that are separate from the one or more first data sources that collect the first data, wherein the one or more third automation bots are selected for performing the identified one or more first automation actions based on proximity to at least one of a source of the at least one first issue or a determined location for implementing the identified one or more first automation actions.

According to some embodiments, the automated services platform may manage connections, and may communicate, with each of the plurality of data sources and with each of the plurality of automation bots, the plurality of data sources and the plurality of automation bots being disposed within one or more networks providing the one or more first services. In some cases, at least one data source comprises at least one automation bot. In some instances, managing connections, and communicating, with each of the plurality of data sources may be performed via a first application programming interface ("API") between the automated services platform and each of the plurality of data sources, while managing connections, and communicating, with each of the plurality of automation bots may be performed via a second API between the automated services platform and each of the plurality of automation bots. In some cases, collecting data from each of the plurality of data sources may comprise collecting data from each of the plurality of data sources via an orchestration system. Autonomously sending the one or more first instructions to the one or more first automation bots may comprise autonomously sending the one or more first instructions to the one or more first automation bots via the orchestration system. The first API may communicatively couple the orchestration system with each of the plurality of data sources, and the second API may communicatively couple the orchestration system with each of the plurality of automation bots, while a third API may communicatively couple the orchestration system with the automated services platform, and a fourth API may communicatively couple the automated services platform with the user terminal. According to some embodiments, the method may further comprise monitoring and tracking, using the automated services platform, success rates and failure rates of each of the plurality of automation bots based at least in part on analysis of one or more of updated collected data or data directly collected from each of the plurality of automation bots.

In some embodiments, collecting data from each of the plurality of data sources is performed at least one of continuously, periodically, randomly, or in response to a request to collect data, and/or the like. In such cases, the method may further comprise: autonomously analyzing, using the automated services platform, updated collected data that is collected after the identified one or more first automation actions have been performed, to determine whether the identified one or more first automation actions have resolved the at least one first issue; and based on a determination that the at least one first issue has not been resolved by the identified one or more first automation actions, determining, using the automated services platform, one or more first non-automation actions to address the at least one first issue. The one or more first non-automation actions may comprise at least one of remote tasks requiring actuation or selection by the user via one or more generated first options in the UI, user-controlled remote reconfiguration of nodes for provisioning the at least one first service via one or more generated second options in the UI, or dispatching of field technicians to physically diagnose and resolve the at least one first issue via one or more generated third options in the UI, and/or the like.

According to some embodiments, the method may further comprise generating and presenting, using the automated services platform, an administration platform UI within the UI, the administration platform UI displaying to the user at least one of one or more fourth options for configuring or reconfiguring one or more automation actions among a plurality of automation actions or one or more fifth options for configuring or reconfiguring one or more automation bots among the plurality of automation bots.

In some embodiments, the automated services platform may comprise at least one of a service diagnostics computing system, a service provisioning computing system, a service management computing system, a call center computing system, a server computer, a webserver, a cloud computing system, or a distributed computing system, and/or the like. In some cases, the user may comprise one of a call center user associated with the service provider, a field technician associated with the service provider, or the at least one first customer, and/or the like. In some instances, the UI may be generated and presented via a web portal to which the user is logged in.

In another aspect, a system might comprise a plurality of data sources, a plurality of automation bots, and at least one computing system. Each computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: collect data from each of the plurality of data sources, the collected data being associated with a plurality of services provided by a service provider; autonomously analyze the collected data to identify any issues with provisioning one or more first services, among the plurality of services, to at least one first customer; based on a determination that at least one first issue affects provisioning of at least one first service among the one or more first services, autonomously identify one or more first automation actions to address the determined at least one first issue; autonomously send one or more first instructions to one or more first automation bots, among the plurality of automation bots, to perform the identified one or more first automation actions; and generate and present a user interface ("UI") on a user terminal associated with or operated by a user, the UI displaying information regarding at least one of the at least one first issue, the at least one first service affected by the at least one first issue, the identified one or more first automation actions for addressing the at least one first issue, or the one or more first automation bots for performing the one or more first automation actions.

In some embodiments, the at least one computing system may comprise at least one of an automated services platform, a service action guidance engine ("SAGE"), a service diagnostics computing system, a service provisioning computing system, a service management computing system, a call center computing system, a server computer, a webserver, a cloud computing system, or a distributed computing system, and/or the like.

In yet another aspect, a call center-based automated interface between a call center user and a network orchestration system may comprise: a user terminal associated with a call center user who is associated with a service provider; a plurality of data sources that provide data associated with a plurality of services provided by the service provider; a plurality of automation bots configured to perform automation actions related to provisioning of the plurality of services; an orchestration system configured to collect data from the plurality of data sources and configured to control the plurality of bots to perform the automation actions; and an automated services platform configured to establish and manage a first communications link between the automated services platform and the user terminal and configured to establish and manage a second communications link between the automated services platform and the orchestration system, wherein the first and second communications links comprise at least one application programming interface ("API") that serves at least in part as a bridge between the user terminal and each of the plurality of automation bots.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing service diagnostics and provisioning, and, more particularly, to methods, systems, and apparatuses for implementing call center-based automated interface between call center agents and network orchestration systems, in some cases, via application programming interfaces ("APIs"), as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing call center-based automated interface between call center agents and network orchestration systems, in accordance with various embodiments.

In the non-limiting embodiment of FIG. 1, system 100 might comprise an automated services platform 105*a* and a data store or database 110*a* that is local to the automated services platform 105*a*. In some cases, the database 110*a* might be external, yet communicatively coupled, to the automated services platform 105*a*. In other cases, the database 110a might be integrated within the automated services platform 105a. System 100 may further comprise one or more user terminals 115a-115n (collectively, "user terminals 115" or the like) that are operated by corresponding one or more users 120a-120n (collectively, "users 120" or the like). System 100 may further comprise a service action guidance engine ("SAGE") 125a. The automated services platform 105a and corresponding database(s) 110a, as well as user terminals 115a-115n and SAGE 125a may be disposed at call center 130, which may be a facility in which a service provider assembles a number of users 120 (also referred to as, "call center agents," "agents," "customer service representatives," or "representatives," or the like). Alternatively, or additionally, at least some of the user terminals 115 and users 120 may be networked together through the call center 130 (e.g., via virtual private networks ("VPNs"), or the like), without having to be physically present within the physical building(s) or campus(es) of the call center 130 (e.g., for telecommuting, teleworking, or remote working, etc.). Alternative to users 120 being call center agents or the like, at least some users 120 may include, without limitation, a field technician associated with the service provider or the at least one first customer, and/or the like.

In some embodiments, system 100 may further comprise one or more customer premises equipment ("CPE") 135a-135n (collectively, "CPE 135" or the like) and one or more user devices 140a-140n (collectively, "user devices 140" or the like) that are disposed at corresponding customer premises 145a-145n (collectively, "customer premises 145" or the like), each associated with a customer among a plurality of customers 150a-150n (collectively, "customers 150" or the like). System 100 may further comprise a plurality of nodes 155a-155n and/or 160a-160n (collectively, "nodes 155," "nodes 160," "nodes 155-160," or the like), which may be disposed within networks 165a-165n (collectively, "networks 165" or the like) that are operated (and in some cases also owned) by the service provider. In some instances, system 100 may further comprise a plurality of data sources 170a-170n and/or 175a-175n (collectively, "data sources 170," "data sources 175," "data sources 170-175," or the like), a plurality of automation bots 180a-180n (collectively, "automation bots 180" or the like), and orchestration system 185, each of which may be disposed within networks 165a-165n.

According to some embodiments, the automated services platform 105a may include, without limitation, at least one of a service diagnostics computing system, a service provisioning computing system, a service management computing system, or a call center computing system, and/or the like. Alternative or additional to the automated services platform 105a and corresponding database 110a being disposed within call center 130, system 100 might comprise remote automated services platform 105b and corresponding database(s) 110b that communicatively couple with the one or more user terminals 115a-115n at call center 130 via the network(s) 165 and via at least one node 155 or 160. In some embodiments, remote automated services platform 105b might comprise at least one of a server computer, a webserver, a cloud computing system, or a distributed computing system, and/or the like. In some cases, the user terminals may each include, but is not limited to, at least one of a telephone, a headset, a desktop computer, a laptop computer, or a tablet computer, and/or the like. In some instances, the user devices 140 might each include, without limitation, one of a laptop computer, a tablet computer, a smart phone, a mobile phone, or a residential or office telephone, and/or the like. In some cases, customer premises 145, which might each include one of a single family house, a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, or an industrial building or complex, and/or the like.

Figure 2:
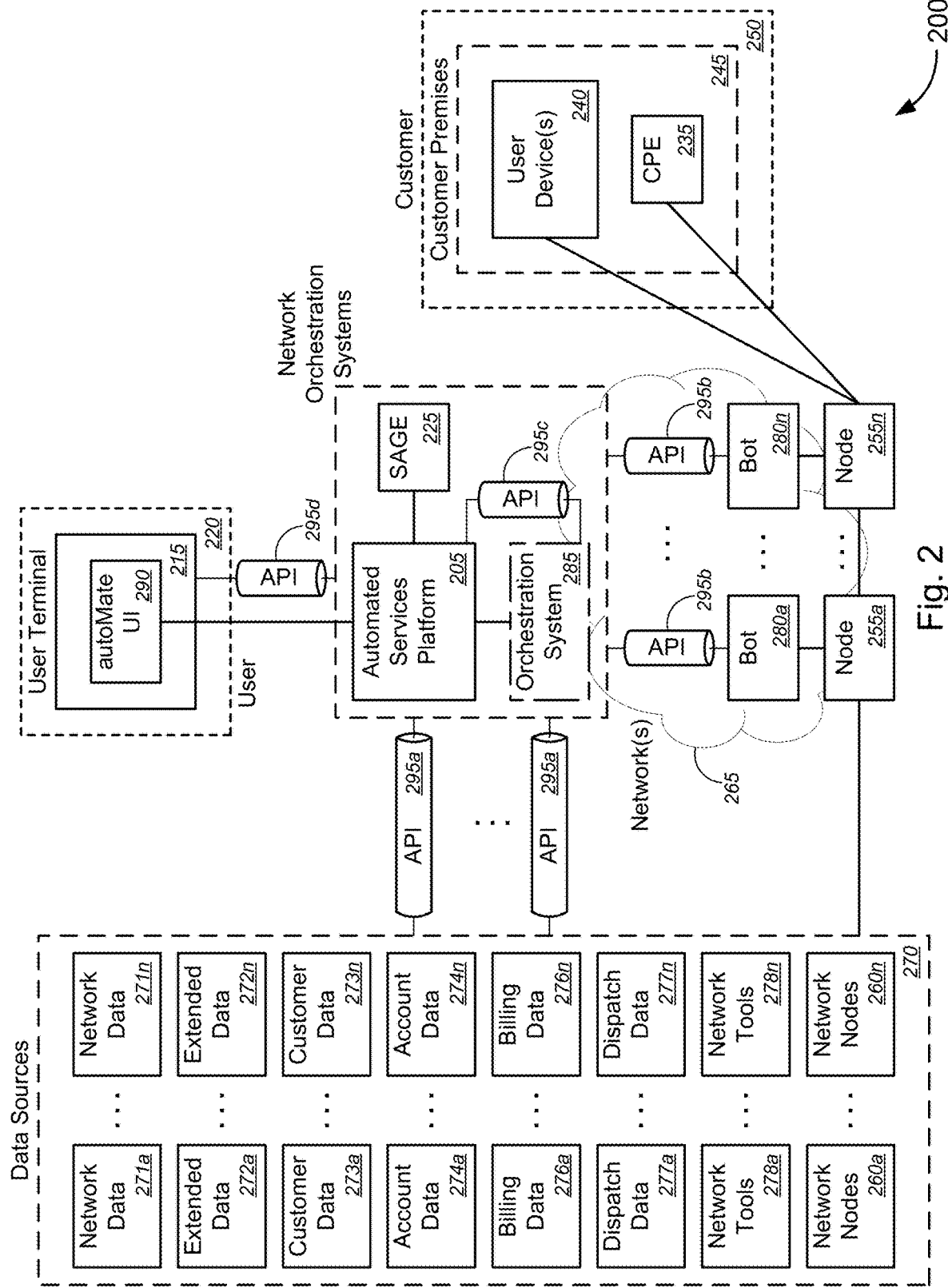
FIG. 2 is a schematic diagram illustrating a non-limiting example of use of application programming interfaces ("APIs") for implementing call center-based automated interface between call center agents and network orchestration systems, in accordance with various embodiments.

Merely by way of example, in some cases, the plurality of data sources 170-175 may include, without limitation, at least one of one or more network data sources, one or more network extended data sources, one or more customer data sources, one or more customer account data sources, one or more billing data sources, one or more dispatch data sources, one or more network tools, or one or more nodes disposed in at least one network via which at least one service among the plurality of services is provisioned, and/or the like (such as shown, e.g., in FIG. 2, or the like).

In some embodiments, networks 165 may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 165 may include an access network of the service provider (e.g., an Internet service provider ("ISP")). In another embodiment, the network(s) 165 may include a core network of the service provider and/or the Internet.

In operation, automated services platform 105a and/or 105b (collectively, "automated services platform" or the like) may collect data from each of a plurality of data sources (e.g., data sources 170-175, or the like), the collected data being associated with a plurality of services provided by a service provider. The collected data may be autonomously analyzed to identify any issues with provisioning one or more first services, among the plurality of services, to at least one first customer (e.g., customer 150a, or the like). Based on a determination that at least one first issue affects provisioning of at least one first service among the one or more first services, one or more first automation actions may be autonomously identified to address the determined at least one first issue. The automated services platform may autonomously send one or more first instructions to one or more first automation bots, among a plurality of automation bots (e.g., automation bots 180a-180n, or the like), to perform the identified one or more first automation actions, and may generate and present a UI on a user terminal associated with or operated by a user (e.g., UI 190a displayed on user terminal 115a associated with or operated by user 120a, or the like). In some cases, the UI may display information regarding at least one of the at least one first issue, the at least one first service affected by the at least one first issue, the identified one or more first automation actions for addressing the at least one first issue, or the one or more first automation bots for performing the one or more first automation actions, and/or the like.

In some embodiments, autonomously identifying the one or more first automation actions to address the determined at least one first issue may comprise the automated services platform autonomously identifying the one or more first automation actions from a plurality of automation actions contained within a library of automation actions that are stored in a first database, to address the determined at least one first issue.

Alternatively, in some cases, determining that the at least one first issue affects provisioning of the at least one first service and identifying the one or more first automation actions to address the determined at least one first issue may comprise the automated services platform comparing the collected data with a plurality of sets of predetermined conditions stored in a second database together with corresponding plurality of automation actions, and determining that at least one first collected data among the collected data matches at least one first set of predetermined conditions among the plurality of sets of predetermined conditions, where the at least one first set of predetermined conditions may correspond to the one or more first automation actions among the plurality of automation actions. In such instances, the automated services platform subsequently may collect updated data from each of the plurality of data sources; may compare at least one second collected data, among the updated data, with the at least one first set of predetermined conditions, the at least one second collected data being updated data of the at least one first collected data; and may determine whether the at least one first issue has been resolved by the one or more first automation bots based at least in part on the comparison. If so, the system may move on to another issue (if any). If not, the system may repeat the processes above with respect to determination of other automation actions and automation bots for address the at least one first issue, and subsequently determining whether the at least one first issue has been resolved. Once all predetermined automation actions have been exhausted, the system may recommend dispatching field technicians to resolve the at least one first issue.

Alternatively, or additionally, autonomously analyzing the collected data to identify any issues with provisioning the one or more first services to the at least one first customer and autonomously identifying the one or more first automation actions to address the determined at least one first issue may comprise: the automated services platform sending the collected data to a service action guidance engine (e.g., SAGE 125*a* or 125*b*, or the like); the service action guidance engine autonomously analyzing the collected data to identify any issues with provisioning one or more first services, among the plurality of services, to the at least one first customer; the service action guidance engine autonomously identifying the one or more first automation actions from a plurality of automation actions contained within a library of automation actions that are stored in a database, to address the determined at least one first issue; and the service action guidance engine sending the identified one or more first automation actions to the automated services platform; and/or the like.

In some cases, the collected data may comprise data associated with provisioning services to all customers of the service provider. In such cases, the service action guidance engine may autonomously analyze the collected data to identify at least one of any common issues, any related issues, or any widespread issues with provisioning services, among the plurality of services, to a plurality of second customers of the service provider. Based on a determination that at least one second issue affects provisioning of at least one second service among the one or more second services, the service action guidance engine or the automated services platform may autonomously identify one or more second automation actions to address the determined at least one second issue. The automated services platform may subsequently autonomously send one or more second instructions to one or more second automation bots, among the plurality of automation bots, to perform the identified one or more second automation actions.

According to some embodiments, collecting data from each of the plurality of data sources may comprise collecting data from each data source containing data directly associated with provisioning the one or more first services to the at least one first customer and from each data source containing data indirectly associated with provisioning the one or more first services, or the like. In some cases, the data indirectly associated with provisioning the one or more first services may include, without limitation, at least one of data retrieved from an outage reporting system that collects outage data associated with provisioning the one or more first services, data associated with provisioning the one or more first services that has been posted via an application programming interface ("API") call by the outage reporting system, data associated with other customers in proximity to the at least one first customer, data associated with network nodes along potential network paths configured to provision the one or more first services, or data associated with services unassociated with the one or more first services yet indicative of geographical events, natural events, or events caused by humans, or the like, that are determined to have a non-zero probability of affecting provisioning of the one or more first services to the at least one first customer, and/or the like.

In some embodiments, the one or more first automation bots may include, but are not limited to, one or more first data sources, among the plurality of data sources, that collect first data that may be indicative of the at least one first issue; one or more second automation bots that are separate from the one or more first data sources that collect the first data, where the one or more second automation bots may be identified subsequent to identifying the one or more first automation actions based on its capability of performing the identified one or more first automation actions; or one or more third automation bots that are separate from the one or more first data sources that collect the first data, where the one or more third automation bots may be selected for performing the identified one or more first automation actions based on proximity to at least one of a source of the at least one first issue or a determined location for implementing the identified one or more first automation actions; and/or the like.

According to some embodiments, the automated services platform may manage connections, and may communicate, with each of the plurality of data sources and with each of the plurality of automation bots, the plurality of data sources and the plurality of automation bots being disposed within one or more networks providing the one or more first services. In some instances, at least one data source may comprise at least one automation bot. In some cases, managing connections, and communicating, with each of the plurality of data sources may be performed via a first application programming interface ("API") between the automated services platform and each of the plurality of data sources. In some instances, managing connections, and communicating, with each of the plurality of automation bots may be performed via a second API between the automated services platform and each of the plurality of automation bots.

In some embodiments, collecting data from each of the plurality of data sources may comprise collecting data from each of the plurality of data sources via an orchestration system (e.g., orchestration system 185, or the like), and autonomously sending the one or more first instructions to the one or more first automation bots may comprise autonomously sending the one or more first instructions to the one or more first automation bots via the orchestration system. In such cases, the first API may communicatively couple the orchestration system with each of the plurality of data sources, and the second API may communicatively couple the orchestration system with each of the plurality of automation bots, while a third API may communicatively couple the orchestration system with the automated services platform, and a fourth API may communicatively couple the automated services platform with the user terminal. In some instances, the automated services platform may monitor and track success rates and failure rates of each of the plurality of automation bots based at least in part on analysis of one or more of updated collected data or data directly collected from each of the plurality of automation bots.

According to some embodiments, collecting data from each of the plurality of data sources may be performed at least one of continuously, periodically, randomly, or in response to a request to collect data, and/or the like. In such cases, the automated services platform may autonomously analyze updated collected data that may be collected after the identified one or more first automation actions have been performed, to determine whether the identified one or more first automation actions have resolved the at least one first issue. Based on a determination that the at least one first issue has not been resolved by the identified one or more first automation actions, the automated services platform may determine one or more first non-automation actions to address the at least one first issue. In some instances, the one or more first non-automation actions may include, without limitation, at least one of remote tasks requiring actuation or selection by the user via one or more generated first options in the UI, user-controlled remote reconfiguration of nodes for provisioning the at least one first service via one or more generated second options in the UI, or dispatching of field technicians to physically diagnose and resolve the at least one first issue via one or more generated third options in the UI, and/or the like.

In some embodiments, the automated services platform may generate and present an administration platform UI (e.g., UI 305a-305e as shown in FIGS. 3A-3E, or the like) within the UI, the administration platform UI displaying to the user at least one of one or more fourth options for configuring or reconfiguring one or more automation actions among a plurality of automation actions or one or more fifth options for configuring or reconfiguring one or more automation bots among the plurality of automation bots, and/or the like. In some instances, the UI may be generated and presented via a web portal to which the user is logged in, or the like.

In some aspects, a call center-based automated interface between a call center user and a network orchestration system may include, but is not limited to, a user terminal associated with a call center user who is associated with a service provider; a plurality of data sources that provide data associated with a plurality of services provided by the service provider; a plurality of automation bots configured to perform automation actions related to provisioning of the plurality of services; an orchestration system configured to collect data from the plurality of data sources and configured to control the plurality of bots to perform the automation actions; and an automated services platform configured to establish and manage a first communications link between the automated services platform and the user terminal and configured to establish and manage a second communications link between the automated services platform and the orchestration system, where the first and second communications links may include at least one API that serves at least in part as a bridge between the user terminal and each of the plurality of automation bots.

These and other functions of the system 100 (and its components) are described in greater detail below with respect to FIGS. 2-4.

FIG. 2 is a schematic diagram illustrating a non-limiting example 200 of use of application programming interfaces ("APIs") for implementing call center-based automated interface between call center agents and network orchestration systems, in accordance with various embodiments.

With reference to the non-limiting example of FIG. 2, system 200 may comprise automated services platform 205 and user terminal 215 that is associated with, or operated by, user 220. System 200 may further comprise customer premises equipment ("CPE") 235 and user device(s) 240 disposed within customer premises 245 associated with customer 250. In the case that the user 220 is a call center user or agent, the automated services platform 205 and user terminal 215 may, in some cases, be disposed within a call center (e.g., call center 130 of FIG. 1, or the like) or accessed via the call center (e.g., in a telecommuting, teleworking, or remote working setup, etc.). Alternatively, in the case that the user 220 is a field technician associated with the service provider, the user terminal 215 may be a portable device that is brought from one location to another where the field technician may be dispatched to resolve any issues with provisioning of at least one service provided by the service provider to at least one customer. In another alternative embodiment, in the case that the user 220 is a customer (e.g., customer 250, or the like) of the service provider, the user terminal 215 may comprise one of the user devices 240 that are disposed in customer premises 245 or a portable user device (not shown) that is disposed outside customer premises 245.

System 200 may further comprise one or more nodes 255a-255n (collectively, "nodes 255" or the like), one or more automation bots 280a-280n (collectively, "automation bots 280" or "bots 280" or the like), and orchestration system 285 that may be disposed within network(s) 265. In some cases, system 200 may further comprise a plurality of data sources 270 and a service action guidance engine ("SAGE") 225, each of which may be disposed in network(s) 265 (not shown) or outside network(s) 265, or the like. Automated services platform 205, SAGE 225, and orchestration system 285 are collectively referred to herein as "network orchestration systems."

Merely by way of example, in some cases, the plurality of data sources 270 may include, but are not limited to, one or more network data sources 271a-271n (collectively, "network data sources 271" or "data sources 271 containing network data," or the like), one or more network extended data sources 272a-272n (collectively, "network extended data sources 272" or "data sources 272 containing network extended data," or the like), one or more customer data sources 273a-273n (collectively, "customer data sources 273" or "data sources 273 containing customer data," or the like), one or more customer account data sources 274a-274n (collectively, "customer account data sources 274" or "data sources 274 containing customer account data," or the like), one or more billing data sources 276a-276n (collectively, "billing data sources 276" or "data sources 276 containing billing data," or the like), one or more dispatch data sources 277a-277n (collectively, "dispatch data sources 277" or "data sources 277 containing dispatch data," or the like), one or more network tools 278a-278n (collectively, "network tools 278" or "data sources 278 containing network tools," or the like), or one or more nodes 260a-260n (collectively, "network nodes 260" or "data sources 260," or the like) disposed in at least one network via which at least one service among the plurality of services is provisioned, and/or the like.

According to some embodiments, the network data may include, without limitation, at least one of data collected from or associated with the Auto Switch system (as described in U.S. patent application Ser. No. 17/491,013, filed Sep. 30, 2021, by Jaime Lemley et al., entitled, "Auto Switch—Call Center-Based Automated Interface with Voice Switches for Voice Service Diagnostics and Provisioning," which claims priority to U.S. Patent Application Ser. No. 63/226,519 (the "'519 application"), filed Jul. 28, 2021, by Jaime Lemley et al., entitled, "Auto Switch—Call Center-Based Automated Interface with Voice Switches for Voice Service Diagnostics and Provisioning," the disclosure of each of which is incorporated herein by reference in its entirety for all purposes), data collected from or associated with one or more broadband remote access servers ("BRASs"), data regarding network congestion, data collected from or associated with at least one network aggregator (such as described in U.S. patent application Ser. No. 17/491,186, filed Sep. 30, 2021, (now issued as U.S. Pat. No. 11,647,112, herein referred to as the"'112 patent '"), by Jaime Lemley et al., entitled, "Provisioning Tool-Call Center-Based Automated Interface with Network Switches for Internet Service Diagnostics and Provisioning," which claims priority to U.S. Patent Application Ser. No. 63/227,224 (the "'224 application"), filed Jul. 29, 2021, by Jaime Lemley et al., entitled, "Provisioning Tool-Call Center-Based Automated Interface with Network Switches for Internet Service Diagnostics and Provisioning," the disclosure of each of which is incorporated herein by reference in its entirety for all purposes), data collected from or associated with the Provisioning Tool system (as described in the '112 patent), or data collected from or associated with at least one remote authentication dial-in user service ("RADIUS") server, and/or the like. In some instances, the network extended data may include, but is not limited to, at least one of data collected from or associated with at least one access control server ("ACS"; which is an authentication, authorization, and accounting platform that allows users to centrally manage access to network resources for a variety of access types, devices, and user groups, while authenticating and authorizing wireless users and hosts, and enforcing wireless policies, etc.), data collected from or associated with at least one Internet connection diagnostic system (e.g., CloudCheck® by Adaptive Spectrum and Signal Alignment, Inc. or ASSIA, etc.; which is an app-based system that enables users to identify the cause of Internet connection slow-downs, or the like), or data collected from or associated with at least one anti-virus software, and/or the like.

In some embodiments, the customer data may include, without limitation, at least one of data collected by services that monitor consumer response to commercial services and products, data collected by services that monitor Internet forums, data collected by services that monitor online blogs, data collected by services that monitor social networks, or data collected by customer engagement systems (e.g., interactive voice response ("IVR") systems or AI-driven customer engagement engines (e.g., ContactEngine®, etc.), or the like) that monitor interactions with customers, and/or the like. In some instances, the customer account data may include, but is not limited to, customer account data for third-party services with which the service provider has partnered (e.g., third-party project management services, third-party location assistance information services, third-party web portal services, third-party cloud identification authentication services, third-party search and discovery metadata platform services, third-party e-mail services, third-party logistics and supply chain services, or third-party online real estate marketplace services, etc.), or the like. In some cases, the billing data may include, without limitation, at least one of data collected or managed by customer care, billing, and/or order management systems, or data collected or managed by customer notification and ordering platforms, and/or the like.

In some instances, the dispatch data may include, but is not limited to, at least one of data collected or managed by work and force administration ("WFA") systems (e.g., WFA dispatch in ("WFA/DI") systems that automate work assignments to technicians who work inside central offices to install and maintain telephone and/or network services, etc.; WFA dispatch out ("WFA/DO") systems that automate work assignments to technicians who work outside central offices to install and maintain telephone and/or network services, etc.; or the like), data collected or managed by public safety data collection and reporting tools used by public safety professionals for traffic and non-traffic related cases, or data collected or managed by computer-aided dispatch, central communications, and/or mapping software platforms used by public safety professionals, and/or the like. In some embodiments, other data collected or managed by the data sources may include, without limitation, at least one of data collected or managed by a platform (e.g., Customer 360 platform, or the like) that captures a holistic view of all information associated with the customer that is also associated with services provided by the customer (such as described in U.S. application Ser. No. 16/366,978 by Gurpreet Sidhu, which is incorporated herein by reference in its entirety for all purposes), data collected or managed by a platform (e.g., a distributed wireless ordering protocol ("DWOP") system, or the like) that provides reference scheduling service order in wireless ad hoc networks via information sharing, or the like, or data regarding operators that are contained in libraries (e.g., Rx Microservices, etc.) that allow the system to build reactive client-side and server-side applications to handle events asynchronously in a manner that maximizes responsiveness, resiliency, and elasticity, and/or the like.

Referring back to FIG. 2, UI 290 may be presented on user terminal 215 and may display information regarding at least one of any identified issues, any services affected by each of the identified issues, one or more automation actions that are identified for addressing each of the identified issues, or one or more automation bots (e.g., among the automation bots 280a-280n, or the like) for performing the one or more automation actions, and/or the like.

The automated services platform 205, the user terminal 215, the user 220, the SAGE 225, the CPE 235, the user device(s) 240, the customer premises 245, the customer 250, the nodes 255a-255n, the network nodes 260a-260n, the network(s) 265, the data sources 270, the automation bots 280a-280n, the orchestration system 285, and the UI 290 of system 200 in FIG. 2 are otherwise similar, if not identical, to the automated services platform 105a and/or 105b, the user terminals 115a-115n, the users 120a-120n, the SAGE 125a and/or 125b, the CPE 135a-135n, the user device(s) 140a-140n, the customer premises 145a-145n, the customers 150a-150n, the nodes 155a-155n, the nodes 160a-160n, the network(s) 165a-165n, the data sources 170a-170n and 175a-175n, the automation bots 180a-180n, the orchestration system 185, and the UIs 190a-190n, respectively, of system 100 in FIG. 1, and the descriptions of these components of system 100 are applicable to the corresponding components of system 200, respectively.

Further to the embodiments as described above with respect to FIG. 1, managing connections, and communicating, with each of the plurality of data sources may be performed via a first application programming interface ("API") (e.g., API 295a, or the like) between the automated services platform (e.g., automated services platform 205, or the like) or the (intermediary) orchestration system (e.g., orchestration system 285, or the like) and each of the data sources (e.g., data sources 260a-260n, 270, 271a-271n, 272a-272n, 273a-273n, 274a-274n, 276a-276n, 277a-277n, and 278a-278n, or the like). Likewise, managing connections, and communicating, with each of the plurality of automation bots may be performed via a second API (e.g., API 295b, or the like) between the automated services platform (e.g., automated services platform 205, or the like) or the (intermediary) orchestration system (e.g., orchestration system 285, or the like) and each of the plurality of automation bots (e.g., automation bots 280a-280n, or the like). In the case that the orchestration system is used as an intermediary between the automated service platform and each data source and/or each automation bot, a third API (e.g., API 295c, or the like) may communicatively couple the orchestration system (e.g., orchestration system 285, or the like) with the automated services platform (e.g., automated services platform 205, or the like). In any event, a fourth API (e.g., API 295d) may communicatively couple the automated services platform (e.g., automated services platform 205, or the like) with the user terminal (e.g., user terminal 215, or the like). In this manner, the automated services platform serves as a platform that is interactive for the end-user and that manages connections and communications with automations or automation bots, thereby creating a bridge between the numerous automations or automation bots and the end-user. The automated services functionality is exposed to the end-user via a single API (in this case, fourth API 295d, or the like) that controls all of the automation functions.

FIGS. 3A-3J (collectively, "FIG. 3") are schematic diagrams illustrating various non-limiting examples 300 of user interfaces ("UIs") may be used when implementing call center-based automated interface between call center agents and network orchestration systems, in accordance with various embodiments. FIGS. 3A-3E depict non-limiting examples of an administration platform UI or sub-UIs 305a-305e, while FIGS. 3F-3J depict non-limiting examples of automated services platform UI or sub-UIs 335a-335d.

Figure 3A:
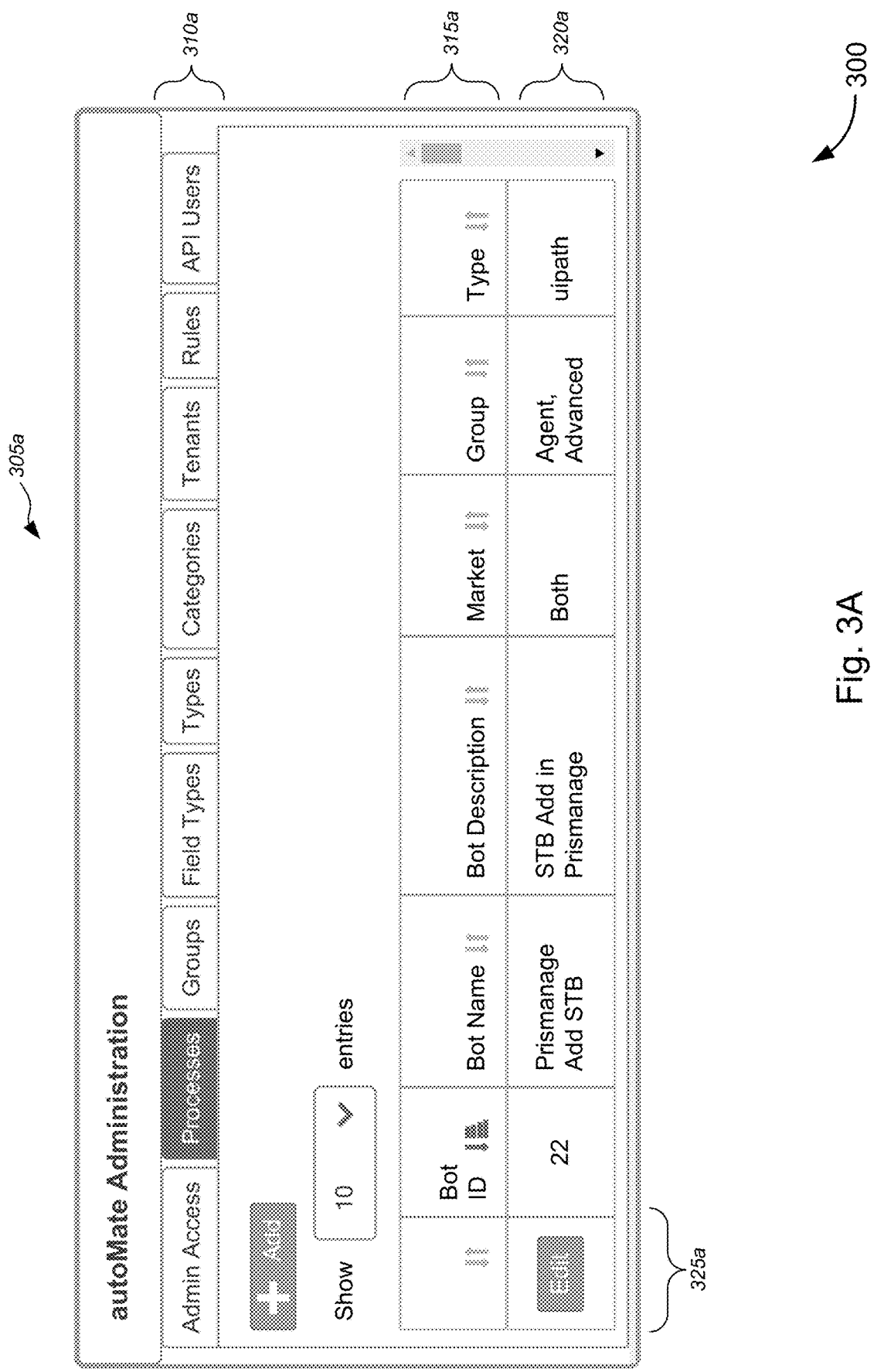

Turning to FIG. 3A, administration platform UI 305a comprises a plurality of tabs 310a including, without limitation, at least one of administrator access tab, processes tab, groups tab, field types tab, types tab, categories tab, tenants tab, rules tab, or API users tab, and/or the like. When a tab 310a is selected (in this case, the processes tab shown in FIG. 3A), the tab may be highlighted and the sub-UI for the processes tab may be displayed, which may include, header fields 315a, data fields 320a, and selectable options 325a, and/or the like. In this non-limiting example, the header fields 315a may include, but are not limited to, at least one of bot ID, bot name, bot description, market, group, or type, and/or the like, with corresponding data fields 320a including, but not limited to, "22," "Prismanage Add STB," "STB Add in Prismanage," "Both," "Agent, Advanced," or "uipath," respectively, or the like. Selectable options 325a may include, without limitation, at least one of adding new entries, showing a selectable or enterable number of entries, editing selected entries, deleting entries, filtering or sorting entries, and/or the like.

When a user selects the "edit" entry option for a particular entry, sub-UIs 305b-305e may be generated and displayed. Referring to FIGS. 3B-3E, non-limiting examples of edit process sub-UIs 305b-305e may each comprise a plurality of tabs 310b including, without limitation, at least one of bot information tab, status/setup tab, orchestrator/server tab, benefit tab, fields tab, or rules tab, and/or the like. When the bot information tab is selected (such as shown in FIG. 3B), a plurality of header fields 315b and corresponding data fields 320b may be displayed. In some instances, the plurality of header fields 315b may include, but is not limited to, at least one of bot ID, bot name, bot description, market, type, impacts, category, or comments, and/or the like, with corresponding data fields 320b including, but not limited to, "20," "Re-Enable PPPoE Login," "Re-Enable Workflow PPPoE Credentials," "CRIS," "uipath," "Network," "Troubleshooting," or "_____," respectively, or the like. In some cases, sub-UI 305b may also include additional options 330b, including, but not limited to, drop-down list options, expand field options (depicted in FIG. 3B, e.g., by the hash symbols on the bottom-right corner of the comments data field, or the like), a submit option, a cancel option, or close window (depicted in FIG. 3B, e.g., by an "X" at the top-right corner of the sub-UI, or the like), and/or the like.

Figure 3C:
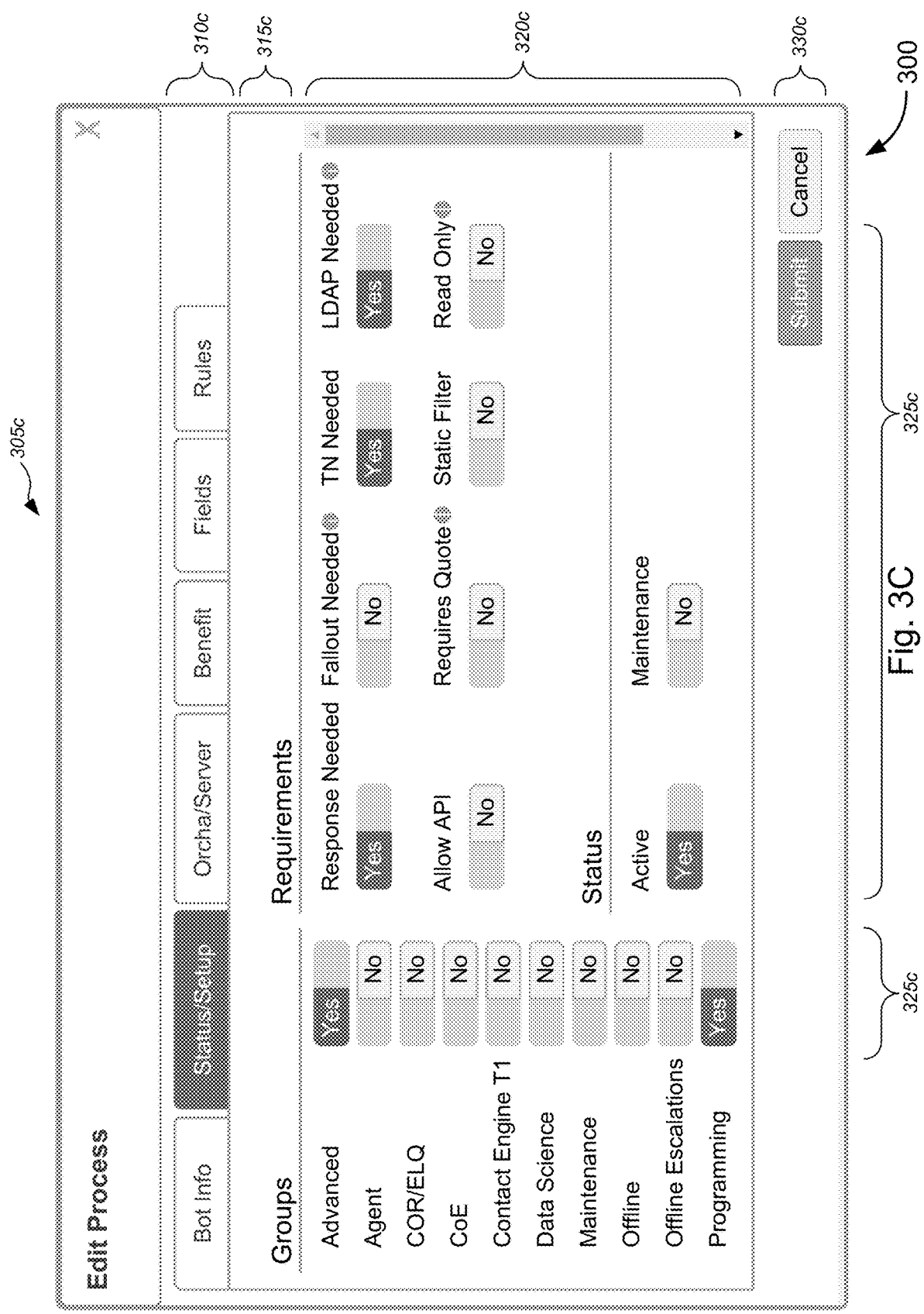

When the status/setup tab is selected (such as shown in FIG. 3C), a plurality of header fields 315c and corresponding data fields 320c may be displayed. In some instances, the plurality of header fields 315c may include, but is not limited to, at least one of groups, requirements, or status, and/or the like, with corresponding data fields 320c including, but not limited to, "Advanced," "Agent," "COR/ELQ," "CoE," "Contact Engine T1," "Data Science," "Maintenance," "Offline," "Offline Escalations," or "Programming," and/or the like under the groups header; "Response Needed," "Fallout Needed," "TN Needed," "LDAP Needed," "Allow API," "Requires Quote," "Static Filter," or "Read Only," and/or the like under the requirements header; and "Active," or "Maintenance," and/or the like under the status header; respectively, or the like. In some cases, sub-UI 305c may also include options 325c including, but not limited to, "Yes/No" toggle buttons, or other selectable options (e.g., radio buttons, check boxes, or other selectors, etc. (not shown)), additional information icons (depicted in FIG. 3C, e.g., by the "i" in a circle beside some of the data fields, or the like), or the like. In some instances, sub-UI 305c may also include additional options 330c, including, but not limited to, a submit option, a cancel option, or close window (depicted in FIG. 3C, e.g., by an "X" at the top-right corner of the sub-UI, or the like), and/or the like.

Figure 3D:
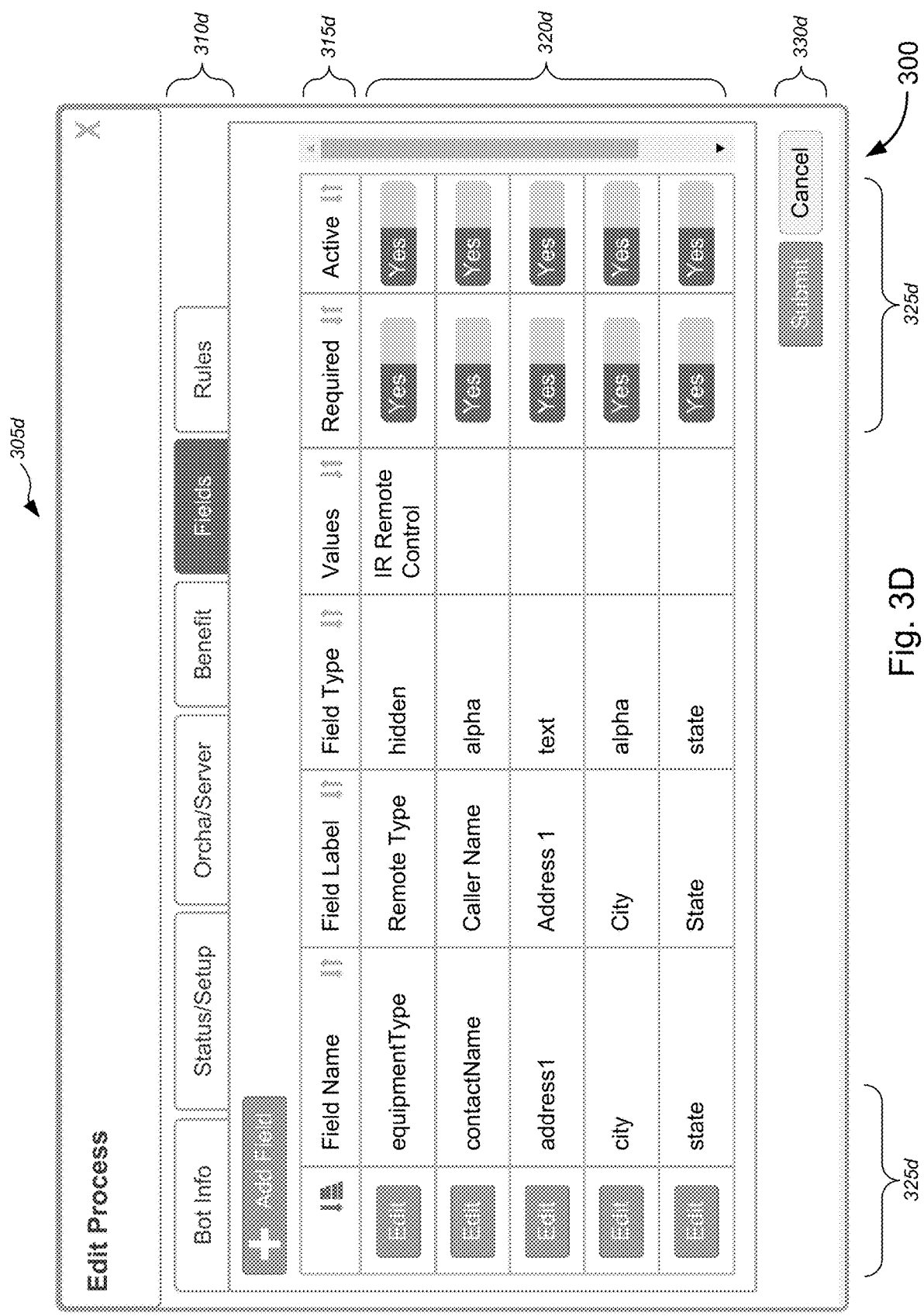

When the fields tab is selected (such as shown in FIG. 3D), a plurality of header fields 315d and corresponding data fields 320d may be displayed. In some instances, the plurality of header fields 315d may include, but is not limited to, at least one of field name, field label, field type, values, required, or active, and/or the like, with corresponding data fields 320d including, but not limited to, "equipmentType," "Remote Type," "hidden," "IR Remote Control," "Yes," or "Yes," respectively, or the like for a first field entry; "contactName," "Caller Name," "alpha," "_____," "Yes," or "Yes," respectively, or the like for a second field entry; "address1," "Address 1," "text," "_____," "Yes," or "Yes,"

respectively, or the like for a third field entry; "city," "City," "alpha," "_____," "Yes," or "Yes," respectively, or the like for a fourth field entry; or "state," "State," "state," "_____," "Yes," or "Yes," respectively, or the like for a fifth field entry; and/or the like. In some instances, sub-UI 305*d* may also include selectable options 325*d* including, without limitation, at least one of adding field entries, editing selected field entries, deleting entries, filtering or sorting field entries, or toggle buttons (e.g., "Yes/No" toggle buttons, or other selectable options, or the like), and/or the like. In some cases, sub-UI 305*d* may also include additional options 330*d*, including, but not limited to, a submit option, a cancel option, or close window (depicted in FIG. 3D, e.g., by an "X" at the top-right corner of the sub-UI, or the like), and/or the like.

Figure 3E:
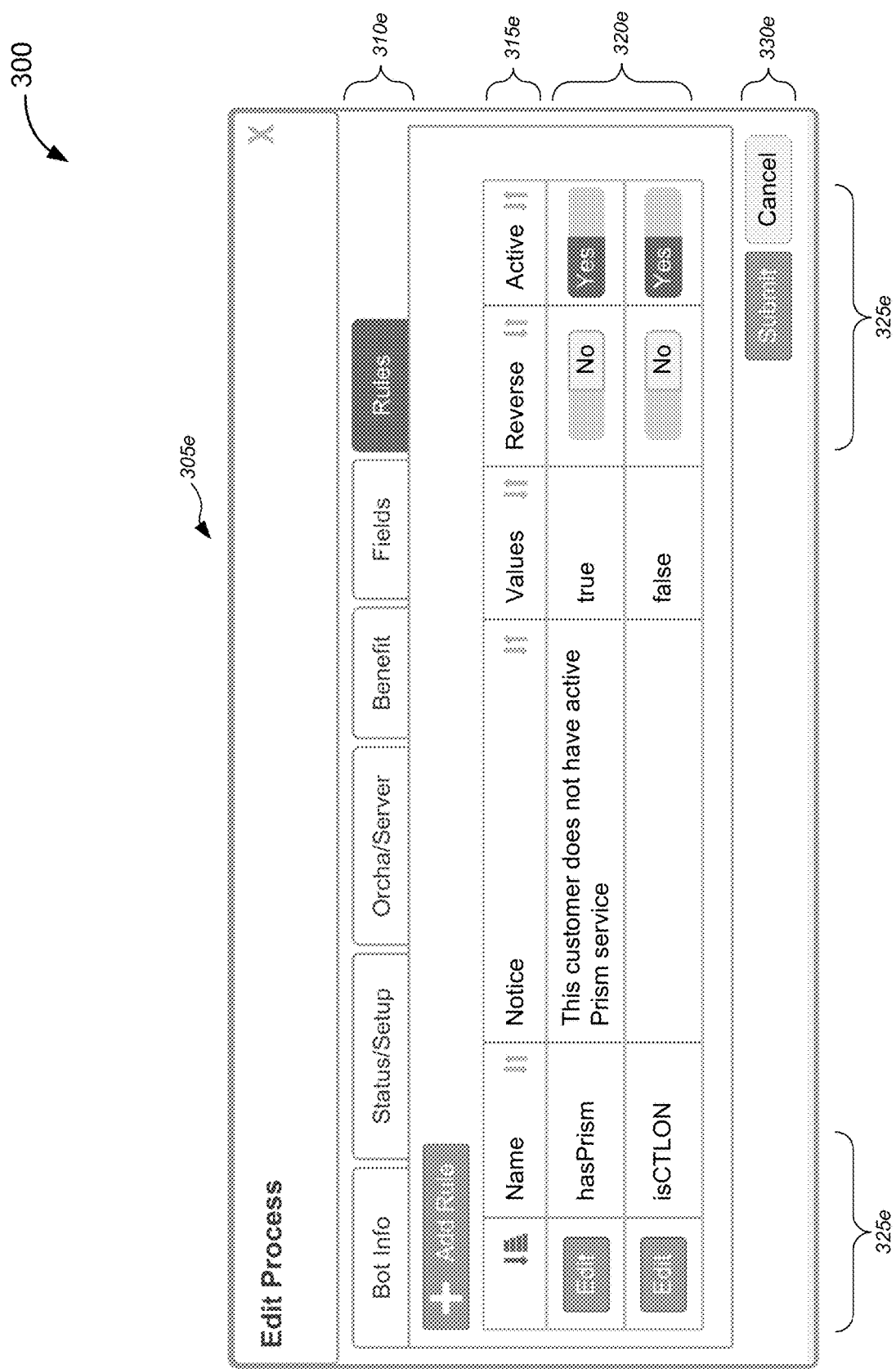

When the rules tab is selected (such as shown in FIG. 3E), a plurality of header fields 315*e* and corresponding data fields 320*e* may be displayed. In some instances, the plurality of header fields 315*e* may include, but is not limited to, at least one of name, notice, values, reverse, or active, and/or the like, with corresponding data fields 320*e* including, but not limited to, "hasPrism," "This customer does not have active Prism service," "true," "No," or "Yes," respectively, or the like for a first rule entry; "isCTLON," "_____," "false," "No," or "Yes," respectively, or the like for a second rule entry; and/or the like. In some instances, sub-UI 305*e* may also include selectable options 325*e* including, without limitation, at least one of adding rule entries, editing selected rule entries, deleting entries, filtering or sorting rule entries, or toggle buttons (e.g., "Yes/No" toggle buttons, or other selectable options, or the like), and/or the like. In some cases, sub-UI 305*e* may also include additional options 330*e*, including, but not limited to, a submit option, a cancel option, or close window (depicted in FIG. 3E, e.g., by an "X" at the top-right corner of the sub-UI, or the like), and/or the like.

Figure 3F:
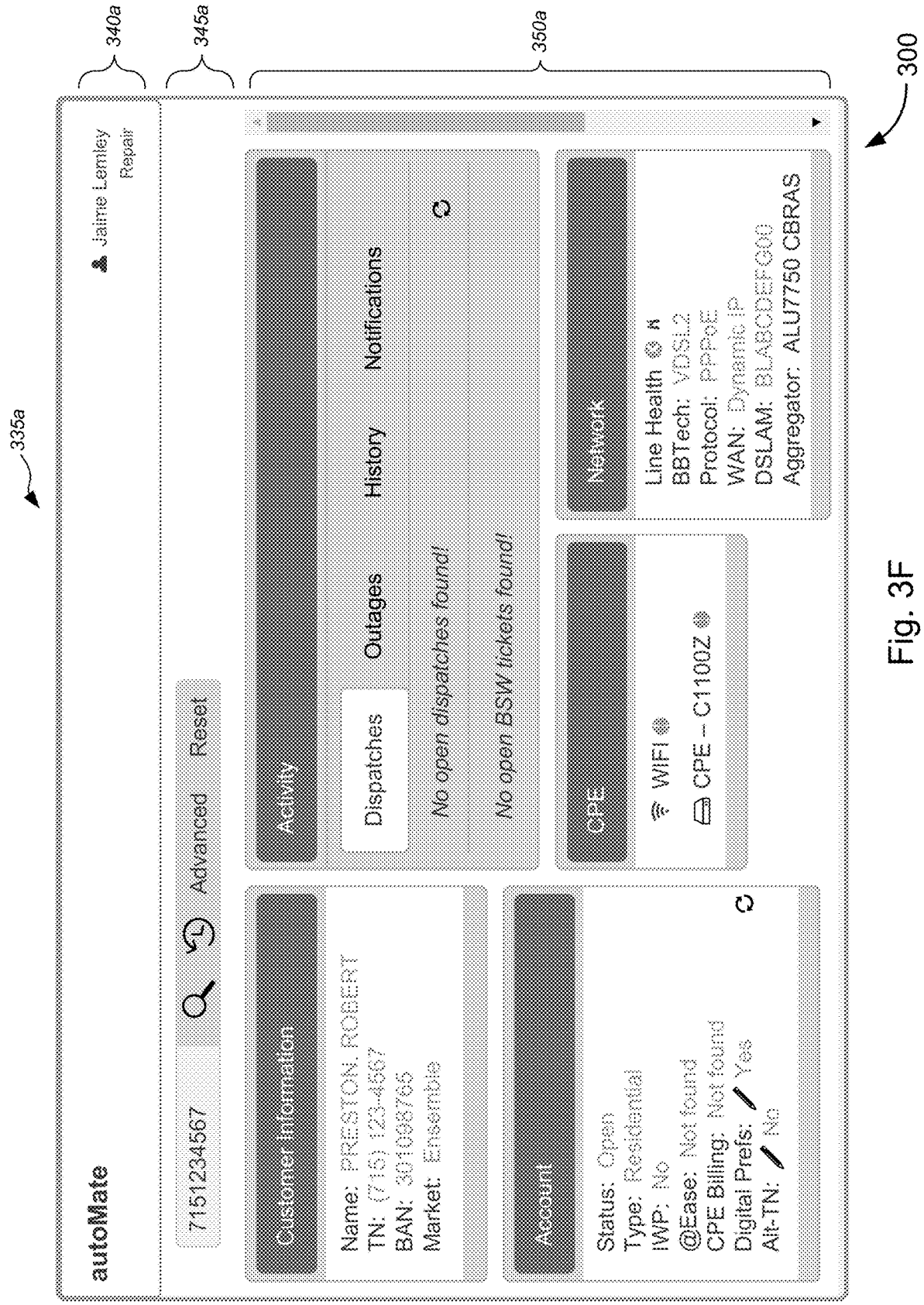
Figure 3G:
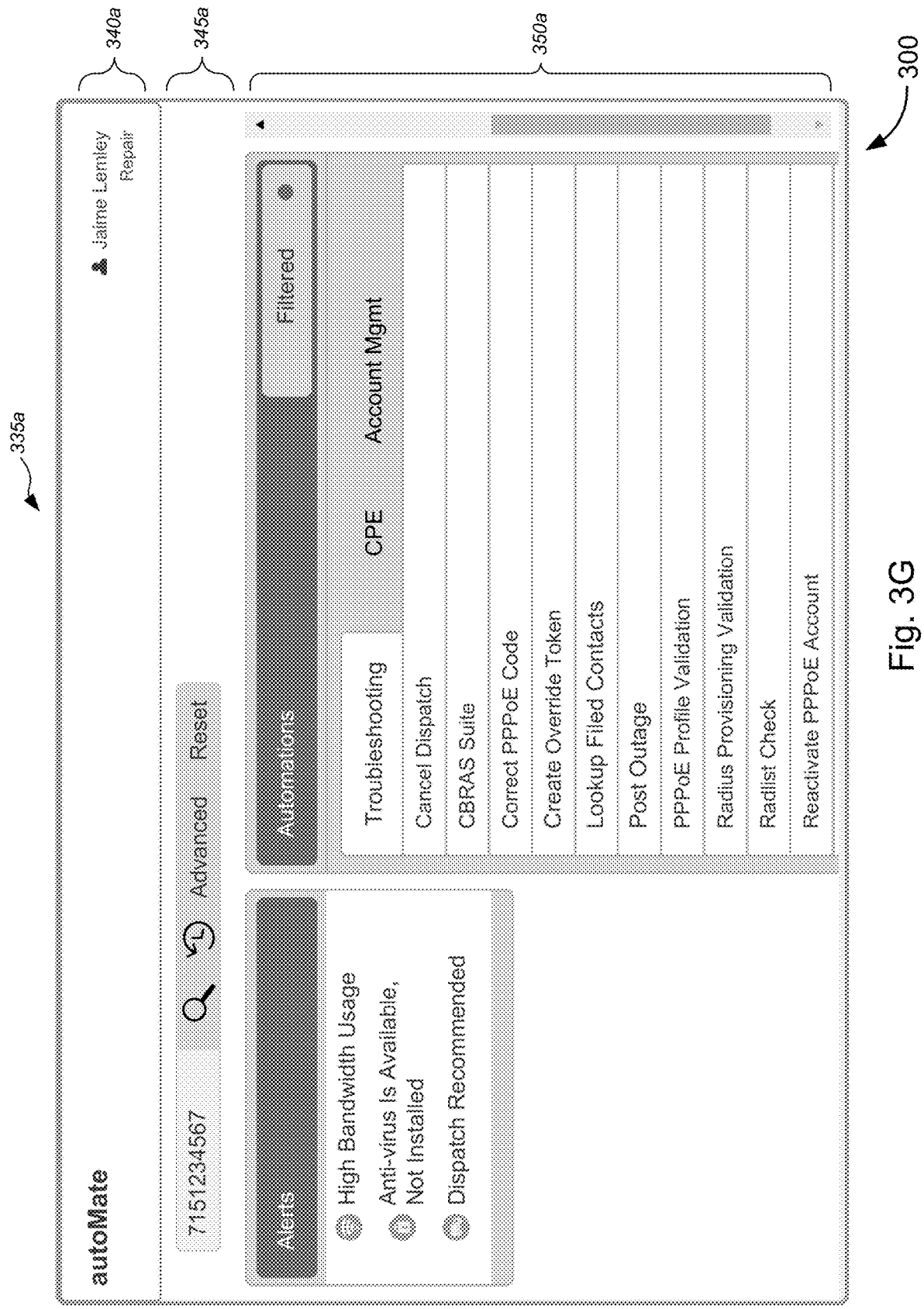

With reference to FIGS. 3F and 3G, the automated services platform UI or sub-UIs 335*a* (referred to herein as "autoMate" UI or the like) may include header 340*a* (which may include information regarding the user, or the like), a customer account search field 345*a* (which may include, without limitation, an input field in which the user may enter a customer account ID (such as a telephone number, username, etc.), one or more input options (e.g., options to search, options to refresh, options to select advanced search options, or options to reset the search, or the like), a plurality of panels 350*a* (including, but not limited to, at least one of a customer information panel, a customer account panel, an activity panel, a CPE panel, a network panel, an alerts panel, and/or an automations panel, etc.), and/or the like, that provide information regarding the service(s) provided to the customer.

Figure 3H:
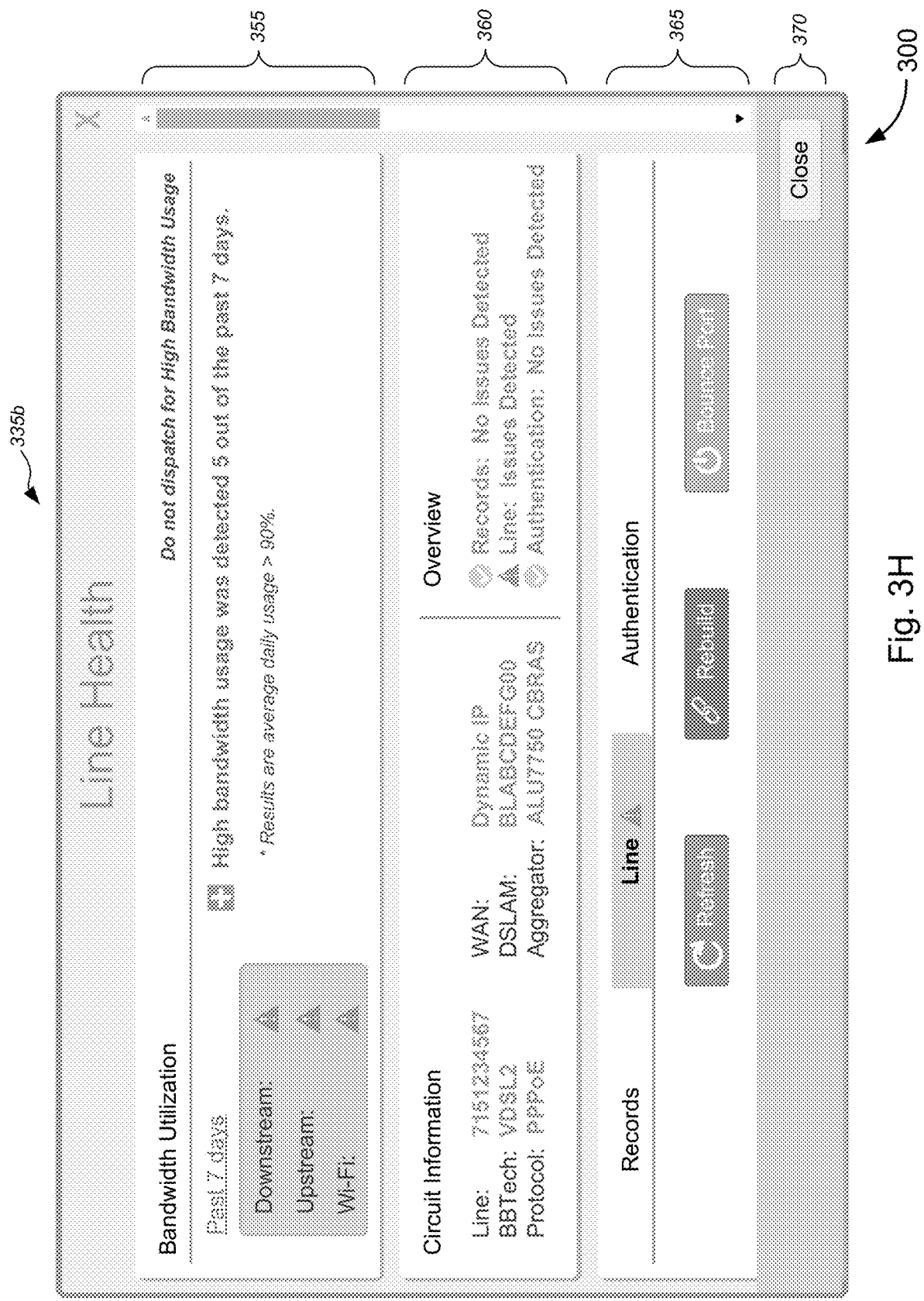
Figure 3I:
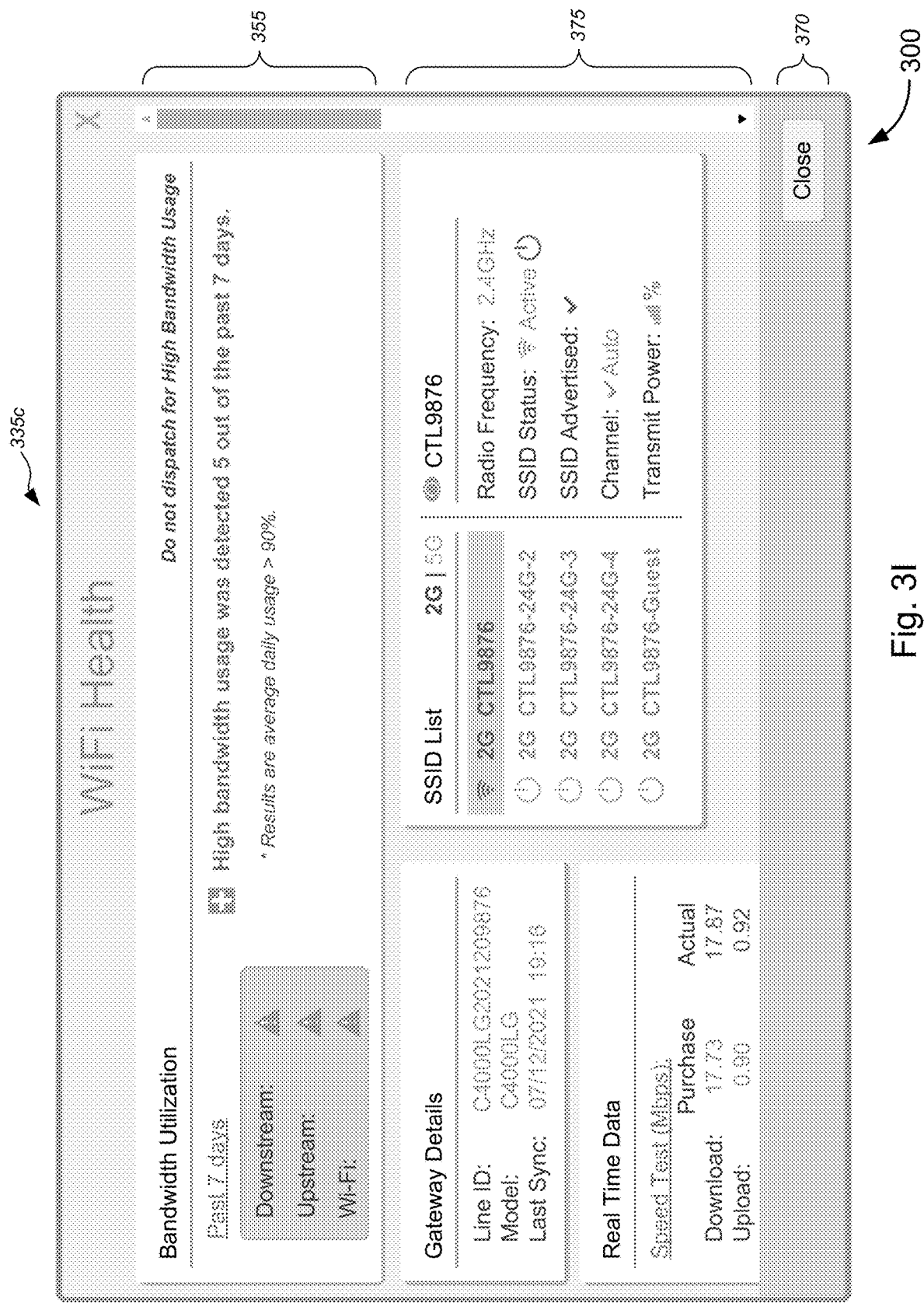
Figure 3J:
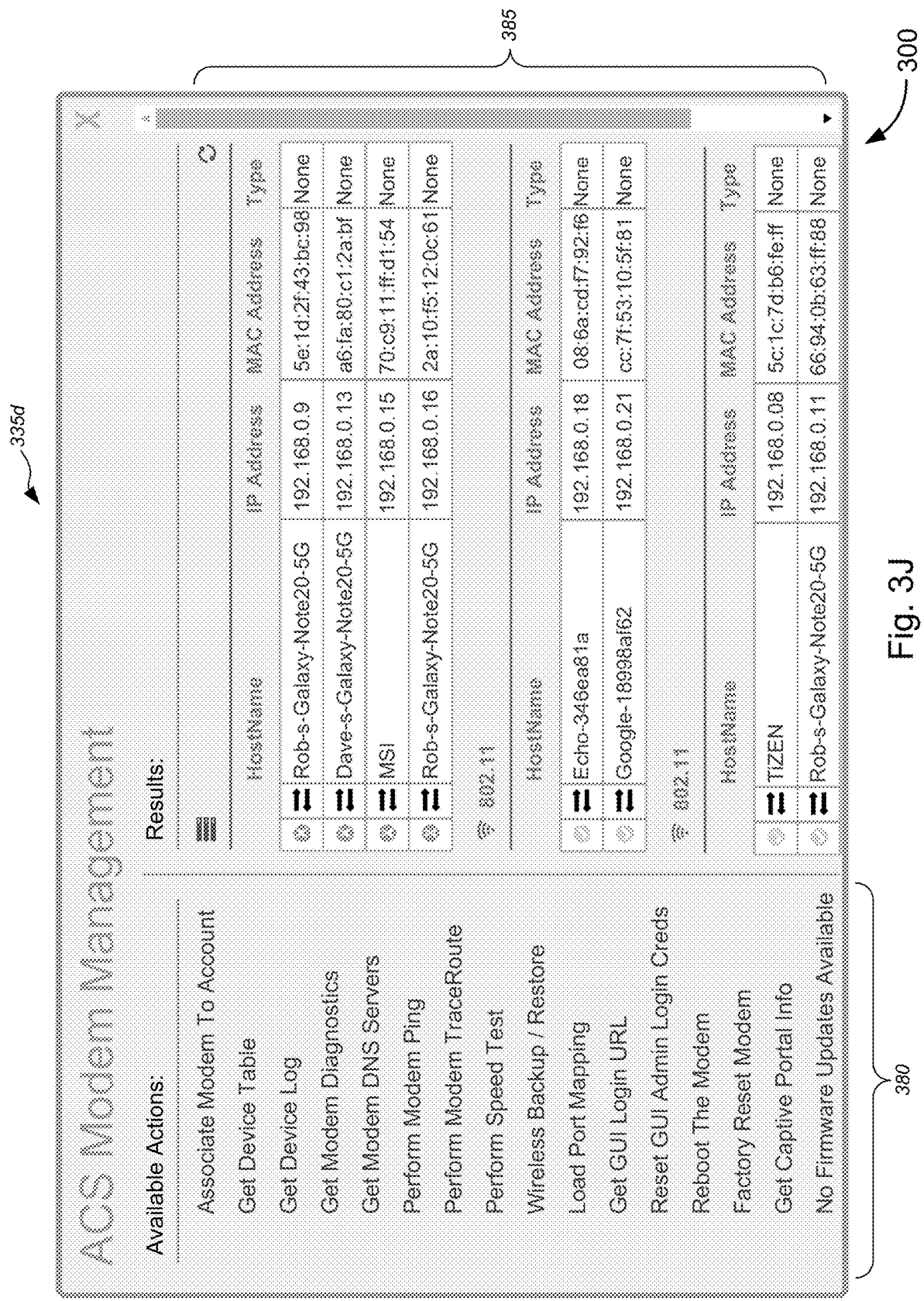

FIGS. 3H-3J depict non-limiting examples of sub-UIs 335*b*-335*d*, respectively, that generate and display information regarding line health (as shown in FIG. 3H, or the like), information regarding WiFi health (as shown in FIG. 3I, or the like), and information regarding access control server ("ACS") modem management (as shown in FIG. 3J, or the like). Referring to FIG. 3H, the line health sub-UI 335*b* may include, without limitation, at least one of a bandwidth utilization panel 355 (depicting information and/or alerts regarding bandwidth utilization, or the like); a circuit information and overview panel 360 (depicting information and/or alerts regarding the circuit used for providing the service(s) to the user and depicting information and/or alerts regarding overall customer account issues (if any), or the like); a records, line, or authentication panel 365 (which may be used to depict information and/or alerts regarding records of the service(s), the line, and/or authentication information, or the like); one or more options (e.g., an option to close the sub-UI window, etc.); and/or the like.

Turning to FIG. 3I, the WiFi health sub-UI 335*c* may include, without limitation, at least one of a bandwidth utilization panel 355 (depicting information and/or alerts regarding bandwidth utilization, or the like); additional panels 375; and one or more options (e.g., an option to close the sub-UI window, etc.); and/or the like. In some cases, the additional panels 375 may include, but are not limited to, at least one of a gateway details panel (depicting information and/or any alerts regarding the gateway that is used for providing the service(s) to the user, or the like); a real-time data panel (depicting information and/or alerts regarding real-time data obtained regarding the service(s) provided to the customer, or the like); or a WiFi data panel (depicting information and/or alerts regarding a list of service set identifiers ("SSIDs") corresponding to available WiFi sources (in the available bands (e.g., 2G, 5G, etc.)), a selected WiFi source, and information regarding the selected WiFi source (e.g., radio frequency, SSID status, a flag indicating whether or not the SSID is advertised, channel, and transmit power, or the like); or the like.

With reference to FIG. 3J, the ACS modem management sub-UI 335*d* may include, but is not limited to, an available actions field 380 (depicting available actions for the user to select with respect to the ACS modem, or the like) and a field 385 containing information regarding visible hosts (depicting hostnames, Internet protocol ("IP") addresses, media access control ("MAC") addresses, types, etc.), or the like.

Although specific examples of headers, data, UI elements, etc. are shown in UIs 305*a*-305*e* of FIGS. 3A-3E and in UIs 335*a*-335*d* of FIGS. 3F-3J, these are merely illustrative. The various embodiments are not so limited, and any suitable set or sets of headers, data, UI elements, etc., may be generated and displayed in these or similar UIs, as well as for technology areas outside of telecommunications services provided by the service provider. These UIs are generated and displayed to provide to the user a consolidated or aggregated view of various aspects of the service(s) provided to a customer of the service provider within a set of UIs, with the data being collected from a plurality of data sources (e.g., data sources 170*a*-170*n*, 175*a*-175*n*, and 270 of FIGS. 1 and 2, or the like) and a plurality of automated bots (e.g., automated bots 180*a*-180*n* and 280*a*-280*n* of FIGS. 1 and 2, or the like) being used to perform one or more tasks related to the service(s), both being controlled or managed by the automated services platform (e.g., automated services platform 105*a*, 105*b*, and 205 of FIGS. 1 and 2, or the like), in some cases, via use of APIs (e.g., APIs 295*a*-295*d* of FIG. 2, or the like).

FIGS. 4A-4E (collectively, "FIG. 4") are flow diagrams illustrating a method 400 for implementing call center-based automated interface between call center agents and network orchestration systems, in accordance with various embodiments. Method 400 of FIG. 4A continues onto FIG. 4C following the circular marker denoted, "A." Alternatively, or additionally, method 400 of FIG. 4A may continue onto FIG. 4E following the circular marker denoted, "B."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 300 of FIGS. 1, 2, and 3 can each also operate according to other modes of operation and/or perform other suitable procedures.

Figure 4A:
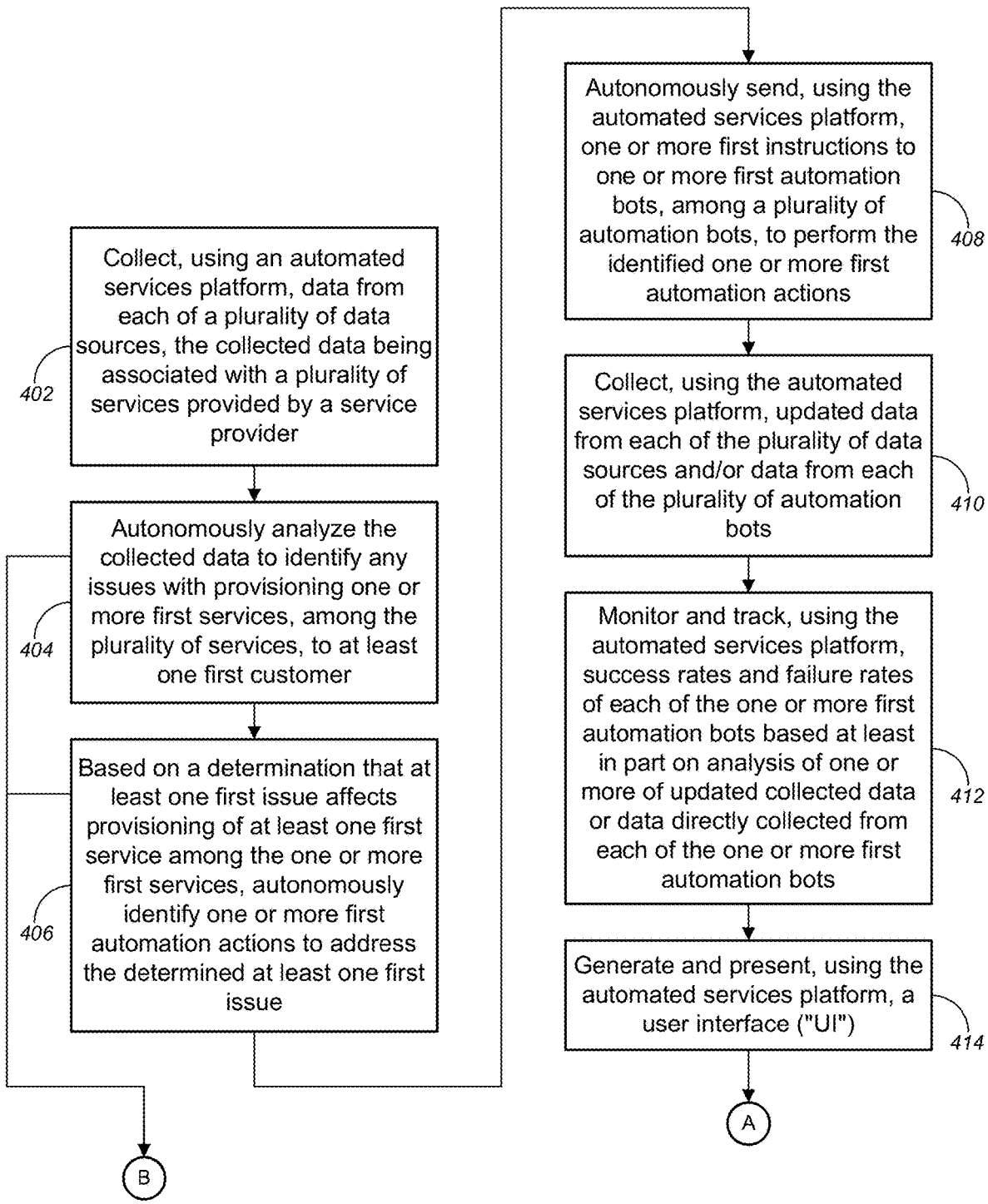

In the non-limiting embodiment of FIG. 4A, method 400, at block 402, may comprise collecting, using an automated services platform, data from each of a plurality of data sources, the collected data being associated with a plurality of services provided by a service provider. According to some embodiments, the automated services platform may include, but is not limited to, at least one of a service diagnostics computing system, a service provisioning computing system, a service management computing system, a call center computing system, a server computer, a webserver, a cloud computing system, or a distributed computing system, and/or the like. In some embodiments, the plurality of data sources may include, without limitation, at least one of one or more network data sources, one or more network extended data sources, one or more customer data sources, one or more customer account data sources, one or more billing data sources, one or more dispatch data sources, one or more network tools, or one or more nodes disposed in at least one network via which at least one service among the plurality of services is provisioned, and/or the like.

At block 404, method 400 may comprise autonomously analyzing the collected data to identify any issues with provisioning one or more first services, among the plurality of services, to at least one first customer. Method 400 may further comprise, at block 406, based on a determination that at least one first issue affects provisioning of at least one first service among the one or more first services, autonomously identifying one or more first automation actions to address the determined at least one first issue.

At block 408, method 400 may further comprise autonomously sending, using the automated services platform, one or more first instructions to one or more first automation bots, among a plurality of automation bots, to perform the identified one or more first automation actions. In some embodiments, method 400 may further comprise collecting, using the automated services platform, updated data from each of the plurality of data sources and/or data from each of the plurality of automation bots (block 410); and monitoring and tracking, using the automated services platform, success rates and failure rates of each of the one or more first automation bots based at least in part on analysis of one or more of updated collected data or data directly collected from each of the one or more first automation actions (block 412).

Method 400, at block 414, may comprise generating and presenting, using the automated services platform, a user interface ("UI") on a user terminal associated with or operated by a user, the UI displaying information regarding at least one of the at least one first issue, the at least one first service affected by the at least one first issue, the identified one or more first automation actions for addressing the at least one first issue, or the one or more first automation bots for performing the one or more first automation actions, and/or the like. In some instances, the user may include, without limitation, one of a call center user associated with the service provider, a field technician associated with the service provider, or the at least one first customer, and/or the like. In some cases, the UI may be generated and presented via a web portal to which the user is logged in.

According to some embodiments, the one or more first automation bots may include, but are not limited to, one of: one or more first data sources, among the plurality of data sources, that collect first data that is indicative of the at least one first issue; one or more second automation bots that are separate from the one or more first data sources that collect the first data, wherein the one or more second automation bots are identified subsequent to identifying the one or more first automation actions based on its capability of performing the identified one or more first automation actions; or one or more third automation bots that are separate from the one or more first data sources that collect the first data, wherein the one or more third automation bots are selected for performing the identified one or more first automation actions based on proximity to at least one of a source of the at least one first issue or a determined location for implementing the identified one or more first automation actions; and/or the like.

In some embodiments, the automated services platform may manage connections, and may communicate, with each of the plurality of data sources and with each of the plurality of automation bots, the plurality of data sources and the plurality of automation bots being disposed within one or more networks providing the one or more first services. In some instances, at least one data source may comprise at least one automation bot. According to some embodiments, managing connections, and communicating, with each of the plurality of data sources may be performed via a first application programming interface ("API") between the automated services platform and each of the plurality of data sources, and managing connections, and communicating, with each of the plurality of automation bots may be performed via a second API between the automated services platform and each of the plurality of automation bots. In some cases, collecting data from each of the plurality of data sources may comprise collecting data from each of the plurality of data sources via an orchestration system. In some instances, autonomously sending the one or more first instructions to the one or more first automation bots may comprise autonomously sending the one or more first instructions to the one or more first automation bots via the orchestration system. In some cases, the first API may communicatively couple the orchestration system with each of the plurality of data sources, and the second API may communicatively couple the orchestration system with each of the plurality of automation bots, while a third API may communicatively couple the orchestration system with the automated services platform, and a fourth API may communicatively couple the automated services platform with the user terminal.

Method 400 may continue onto the process at block 418 in FIG. 4C following the circular marker denoted, "A."

With reference to the non-limiting embodiment of FIG. 4B, according to some embodiments, autonomously identifying the one or more first automation actions to address the determined at least one first issue (block 410) may comprise autonomously identifying, using the automated services platform, the one or more first automation actions from a plurality of automation actions contained within a library of automation actions that are stored in a first database, to address the determined at least one first issue (block 416).

In some embodiments, collecting data from each of the plurality of data sources may be performed at least one of continuously, periodically, randomly, or in response to a request to collect data, and/or the like. In such cases, at block 418 in FIG. 4C (following the circular marker denoted, "A," in FIG. 4A), method 400 may comprise autonomously analyzing, using the automated services platform, updated collected data that is collected after the identified one or more first automation actions have been performed, to determine whether the identified one or more first automation actions have resolved the at least one first issue. Method 400 may further comprise, based on a determination that the at least one first issue has not been resolved by the identified one or more first automation actions, determining, using the automated services platform, one or more first non-automation actions to address the at least one first issue (block 420). In some cases, the one or more first non-automation actions may include, without limitation, at least one of remote tasks requiring actuation or selection by the user via one or more generated first options in the UI, user-controlled remote reconfiguration of nodes for provisioning the at least one first service via one or more generated second options in the UI, or dispatching of field technicians to physically diagnose and resolve the at least one first issue via one or more generated third options in the UI, and/or the like.

According to some embodiments, method 400, at block 422, may comprise generating and presenting, using the automated services platform, an administration platform UI within the UI, the administration platform UI displaying to the user at least one of one or more fourth options for configuring or reconfiguring one or more automation actions among a plurality of automation actions or one or more fifth options for configuring or reconfiguring one or more automation bots among the plurality of automation bots.

Figure 4D:
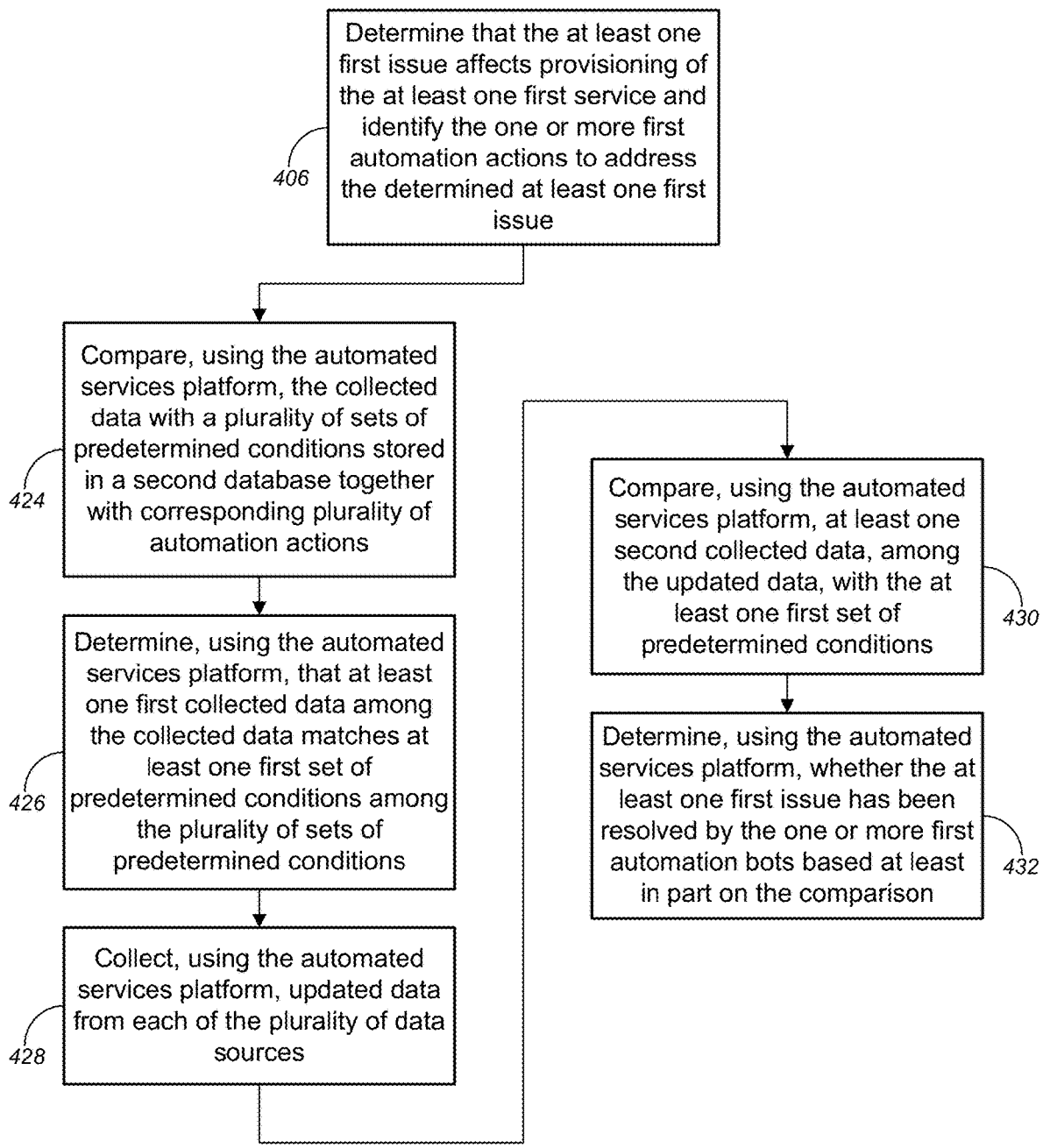

Referring to the non-limiting embodiment of FIG. 4D, determining that the at least one first issue affects provisioning of the at least one first service and identifying the one or more first automation actions to address the determined at least one first issue (at block 406) may comprise: comparing, using the automated services platform, the collected data with a plurality of sets of predetermined conditions stored in a second database together with corresponding plurality of automation actions (block 424); determining, using the automated services platform, that at least one first collected data among the collected data matches at least one first set of predetermined conditions among the plurality of sets of predetermined conditions, wherein the at least one first set of predetermined conditions may correspond to the one or more first automation actions among the plurality of automation actions (block 426); collecting, using the automated services platform, updated data from each of the plurality of data sources (block 428); comparing, using the automated services platform, at least one second collected data, among the updated data, with the at least one first set of predetermined conditions, the at least one second collected data being updated data of the at least one first collected data (block 430); and determining, using the automated services platform, whether the at least one first issue has been resolved by the one or more first automation bots based at least in part on the comparison (block 432).

Figure 4E:
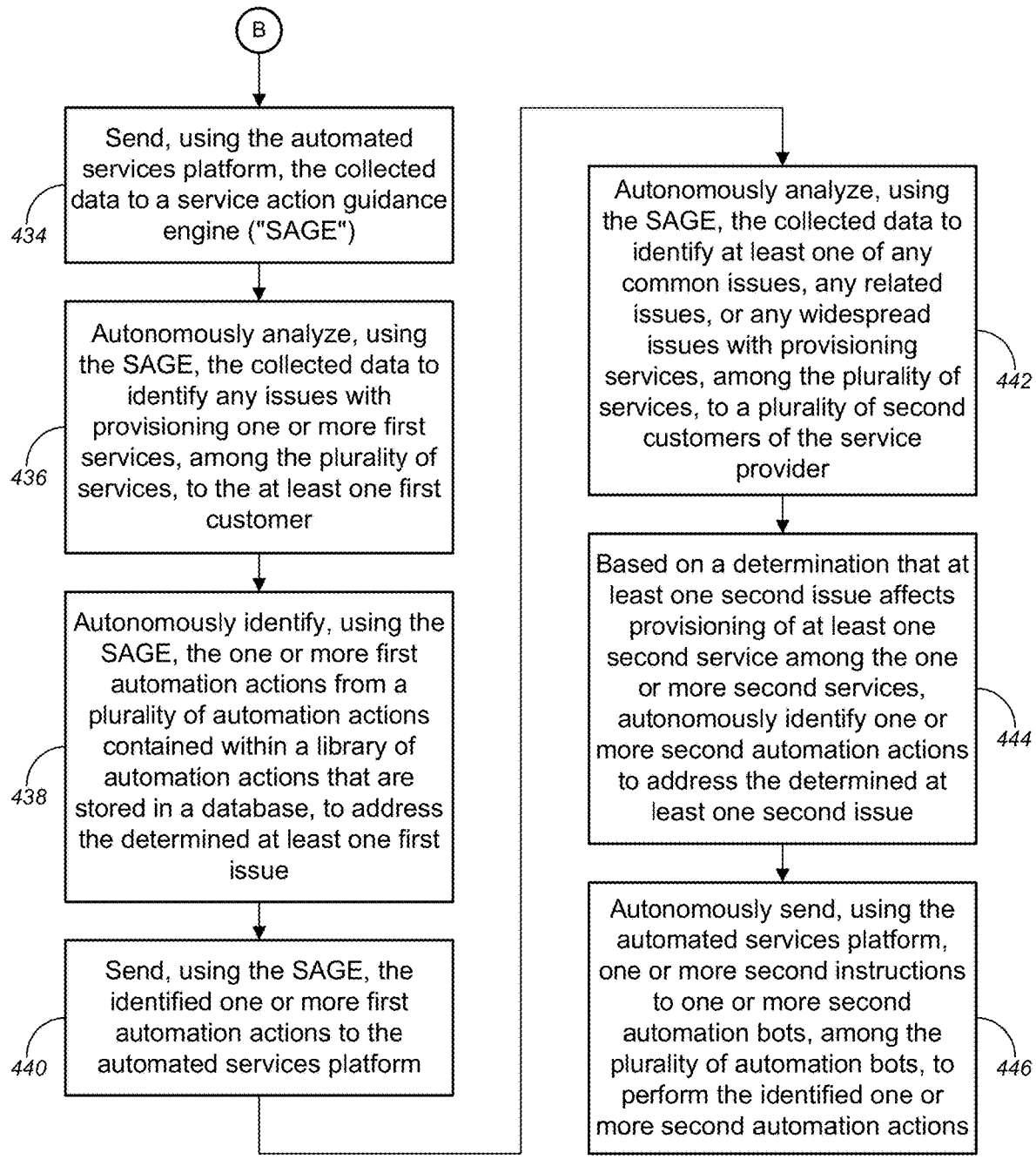

In some embodiments, autonomously analyzing the collected data to identify any issues with provisioning the one or more first services to the at least one first customer (at block 404 of FIG. 4A) and autonomously identifying the one or more first automation actions to address the determined at least one first issue (at block 406) may continue onto the process at block 434 in FIG. 4E following the circular marker denoted, "B."

At block 434 in FIG. 4E (following the circular marker denoted, "B," in FIG. 4A), method 400 may comprise sending, using the automated services platform, the collected data to a service action guidance engine ("SAGE"); autonomously analyzing, using the SAGE, the collected data to identify any issues with provisioning one or more first services, among the plurality of services, to the at least one first customer (block 436); autonomously identifying, using the SAGE, the one or more first automation actions from a plurality of automation actions contained within a library of automation actions that are stored in a database, to address the determined at least one first issue (block 438); and sending, using the SAGE, the identified one or more first automation actions to the automated services platform (block 440).

In some cases, the collected data may comprise data associated with provisioning services to all customers of the service provider. In such cases, the method may further comprise: autonomously analyzing, using the SAGE, the collected data to identify at least one of any common issues, any related issues, or any widespread issues with provisioning services, among the plurality of services, to a plurality of second customers of the service provider (block 442); based on a determination that at least one second issue affects provisioning of at least one second service among the one or more second services, autonomously identifying one or more second automation actions to address the determined at least one second issue (block 444); and autonomously sending, using the automated services platform, one or more second instructions to one or more second automation bots, among the plurality of automation bots, to perform the identified one or more second automation actions (block 446).

In some instances, collecting data from each of the plurality of data sources may comprise collecting data from each data source containing data directly associated with provisioning the one or more first services to the at least one first customer and from each data source containing data indirectly associated with provisioning the one or more first services. In some cases, the data indirectly associated with provisioning the one or more first services may include, without limitation, at least one of data retrieved from an outage reporting system that collects outage data associated with provisioning the one or more first services, data associated with provisioning the one or more first services that has been posted via an application programming interface ("API") call by the outage reporting system, data associated with other customers in proximity to the at least one first customer, data associated with network nodes along potential network paths configured to provision the one or more first services, or data associated with services unassociated with the one or more first services yet indicative of geographical events, natural events, or events caused by humans that are determined to have a non-zero probability of affecting provisioning of the one or more first services to the at least one first customer, and/or the like.

Exemplary System and Hardware Implementation

Figure 5:
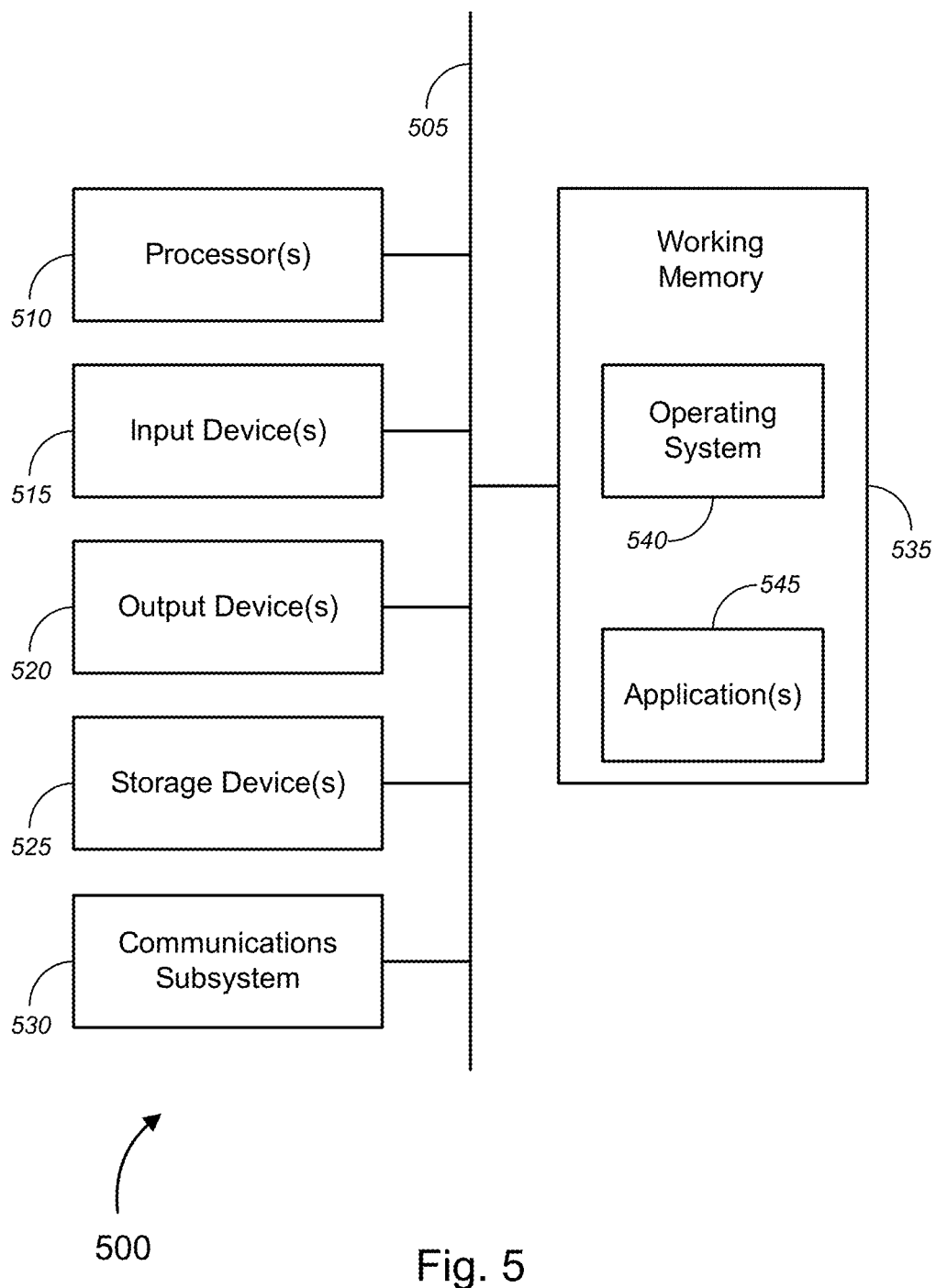
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., automated services platform 105a, 105b, and 205, user terminals 115a-115n and 215, service action guidance engines ("SAGEs") 125a, 125b, and 225, customer premises equipment ("CPE") 135a-135n and 235, user devices 140a-140n and 240, nodes 155a-155n, 160a-160n, 255a-255n, and 260a-260n, data sources 170a-170n, 175a-175n, 270, 271a-271n, 272a-272n, 273a-273n, 274a-274n, 276a-276n, 277a-277n, and 278a-278n, automation bots 180a-180n and 280a-280n, and orchestration system 185 and 285, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., automated services platform 105a, 105b, and 205, user terminals 115a-115n and 215, SAGEs 125a, 125b, and 225, CPE 135a-135n and 235, user devices 140a-140n and 240, nodes 155a-155n, 160a-160n, 255a-255n, and 260a-260n, data sources 170a-170n, 175a-175n, 270, 271a-271n, 272a-272n, 273a-273n, 274a-274n, 276a-276n, 277a-277n, and 278a-278n, automation bots 180a-180n and 280a-280n, and orchestration system 185 and 285, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
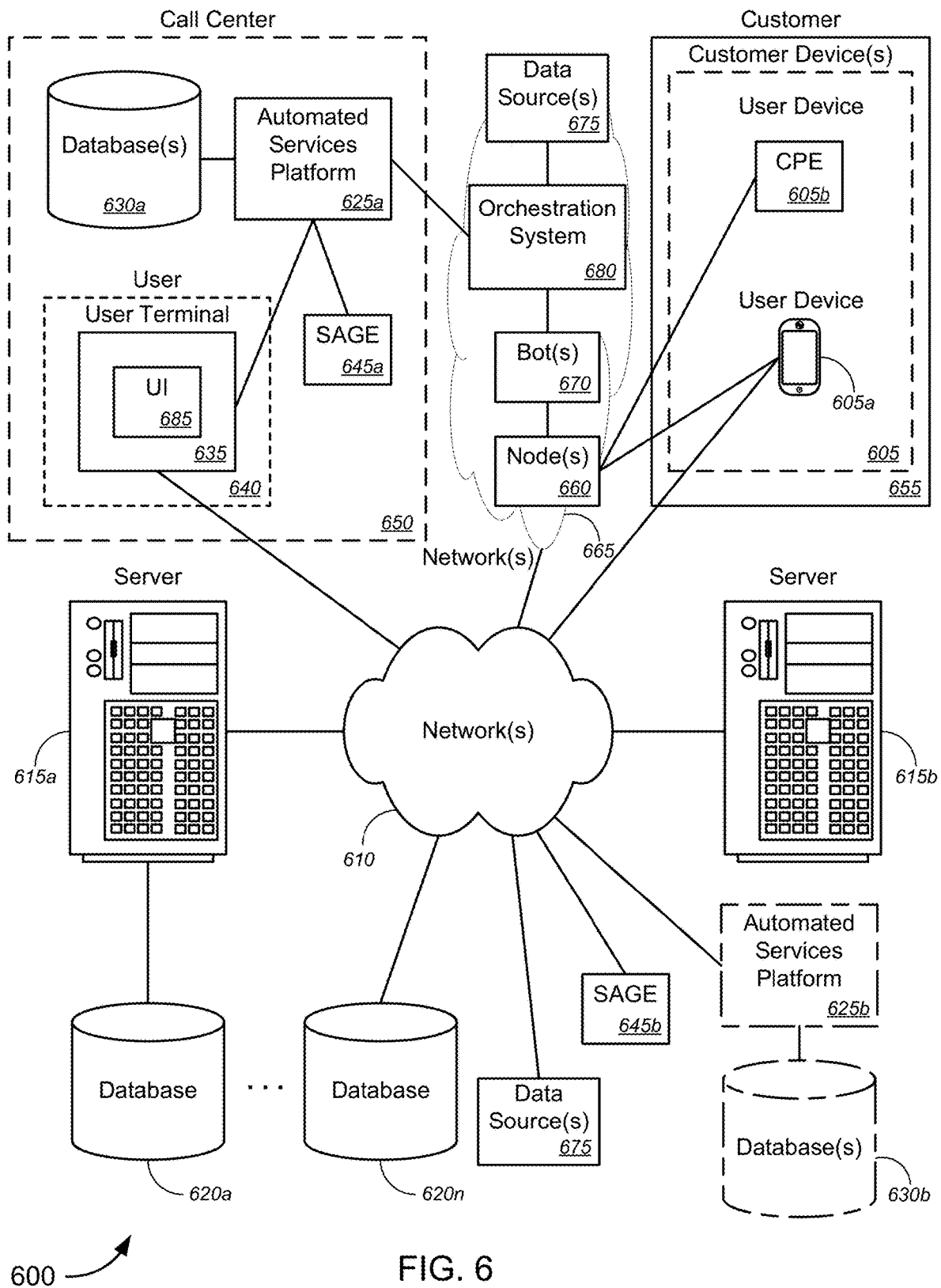
FIG. 6 is a block diagram illustrating a networked system of computers, computing systems, or system hardware architecture, which can be used in accordance with various embodiments.

As noted above, a set of embodiments comprises methods and systems for implementing service diagnostics and provisioning, and, more particularly, to methods, systems, and apparatuses for implementing call center-based automated interface between call center agents and network orchestration systems, in some cases, via application programming interfaces ("APIs"). FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™ IPX™ AppleTalk™, and the like. Merely by way of example, the network(s) 610 (similar to network(s) 165a-165n and 265 of FIGS. 1 and 2, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™ IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing service diagnostics and provisioning, and, more particularly, to methods, systems, and apparatuses for implementing call center-based automated interface between call center agents and network orchestration systems, in some cases, via APIs, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise an automated services platform 625a and corresponding database(s) 630a (similar to automated services platform 105a and 205 and corresponding database(s) 110a of FIGS. 1 and 2, or the like), user terminal 635 operated by user 640 (similar to user terminals 115a-115n and 215 operated by corresponding users 120a-120n and 220 of FIGS. 1 and 2, or the like), and a service action guidance engine ("SAGE") 645a (similar to SAGEs 125a, 125b, and 225 of FIGS. 1 and 2, or the like), all of which may be disposed at call center 650 (similar to call center 130 of FIG. 1, or the like). Alternative or additional to local automated services platform 625a and corresponding database(s) 630a, system 600 may further comprise remote automated services platform 625b and corresponding database(s) 630b (similar to automated services platform 105b and corresponding database(s) 110b of FIG. 1, or the like). Similarly, alternative or additional to local SAGE 645a, system 600 may further comprise remote SAGE 645b (similar to SAGEs 125a, 125b, and 225 of FIGS. 1 and 2, or the like). System 600 may further comprise user device 605a and user customer premises equipment ("CPE") 605b associated with customer 655 (similar to user devices 140a-140n and 240 and customer premises equipment ("CPE") 135a-135n and 235 associated with customers 150a-150n and 250 of FIGS. 1 and 2, or the like).

System 600 may further comprise one or more nodes 660 (similar to nodes 155a-155n, 160a-160n, 255a-255n, and 260a-260n of FIGS. 1 and 2, or the like) in network(s) 665 (similar to networks 165a-165n and 265 of FIGS. 1 and 2, or the like) over which customer 655 may communicate with user terminal 635 at call center 650 using customer device 605 (e.g., user device 605a or 605b, or the like). In some cases, network(s) 655 may be the same as network(s) 610. Alternatively, network(s) 655 may be different from network(s) 610. System 600 may further comprise one or more automation bots 670 (similar to automation bots 180a-180n and 280a-280n of FIGS. 1 and 2, or the like), one or more data sources 675 (similar to data sources 170a-170n, 175a-175n, 270, 271a-271n, 272a-272n, 273a-273n, 274a-274n, 276a-276n, 277a-277n, and 278a-278n of FIGS. 1 and 2, or the like), and orchestration system 680 (similar to orchestration system 185 and 285 of FIGS. 1 and 2, or the like). The one or more nodes 660, the one or more automation bots 670, at least some of the data sources 675, and the orchestration system 680 may be disposed in network(s) 665, or the like. System 600 may further comprise user interface ("UI") 685 (similar to UIs 190a-190n and 290 of FIGS. 1 and 2, or the like) on user terminal 635.

In operation, automated services platform 625a and/or 625b (collectively, "automated services platform" or the like) may collect data from each of a plurality of data sources (e.g., data sources 675, or the like), the collected data being associated with a plurality of services provided by a service provider. The collected data may be autonomously analyzed to identify any issues with provisioning one or more first services, among the plurality of services, to at least one first customer (e.g., customer 655, or the like). Based on a determination that at least one first issue affects provisioning of at least one first service among the one or more first services, one or more first automation actions may be autonomously identified to address the determined at least one first issue. The automated services platform may autonomously send one or more first instructions to one or more first automation bots, among a plurality of automation bots (e.g., automation bots 670, or the like), to perform the identified one or more first automation actions, and may generate and present a UI on a user terminal associated with or operated by a user (e.g., UI 685 displayed on user terminal 635 associated with or operated by user 640, or the like). In some cases, the UI may display information regarding at least one of the at least one first issue, the at least one first service affected by the at least one first issue, the identified one or more first automation actions for addressing the at least one first issue, or the one or more first automation bots for performing the one or more first automation actions, and/or the like.

In some embodiments, autonomously identifying the one or more first automation actions to address the determined at least one first issue may comprise the automated services platform autonomously identifying the one or more first automation actions from a plurality of automation actions contained within a library of automation actions that are stored in a first database, to address the determined at least one first issue.

In some instances, autonomously analyzing the collected data to identify any issues with provisioning the one or more first services to the at least one first customer and autonomously identifying the one or more first automation actions to address the determined at least one first issue may comprise: the automated services platform sending the collected data to a service action guidance engine (e.g., SAGE 645a or 645b, or the like); the service action guidance engine autonomously analyzing the collected data to identify any issues with provisioning one or more first services, among the plurality of services, to the at least one first customer; the service action guidance engine autonomously identifying the one or more first automation actions from a plurality of automation actions contained within a library of automation actions that are stored in a database, to address the determined at least one first issue; and the service action guidance engine sending the identified one or more first automation actions to the automated services platform; and/or the like.

According to some embodiments, the automated services platform may manage connections, and may communicate, with each of the plurality of data sources and with each of the plurality of automation bots, the plurality of data sources and the plurality of automation bots being disposed within one or more networks providing the one or more first services. In some instances, at least one data source may comprise at least one automation bot. In some cases, managing connections, and communicating, with each of the plurality of data sources may be performed via a first application programming interface ("API") between the automated services platform and each of the plurality of data sources. In some instances, managing connections, and communicating, with each of the plurality of automation bots may be performed via a second API between the automated services platform and each of the plurality of automation bots.

In some embodiments, collecting data from each of the plurality of data sources may comprise collecting data from each of the plurality of data sources via an orchestration system (e.g., orchestration system 680, or the like), and autonomously sending the one or more first instructions to the one or more first automation bots may comprise autonomously sending the one or more first instructions to the one or more first automation bots via the orchestration system. In such cases, the first API may communicatively couple the orchestration system with each of the plurality of data sources, and the second API may communicatively couple the orchestration system with each of the plurality of automation bots, while a third API may communicatively couple the orchestration system with the automated services platform, and a fourth API may communicatively couple the automated services platform with the user terminal. In some instances, the automated services platform may monitor and track success rates and failure rates of each of the plurality of automation bots based at least in part on analysis of one or more of updated collected data or data directly collected from each of the plurality of automation bots.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:
1. A method, comprising:
 collecting, using an automated services platform, data from each of a plurality of data sources, the collected data being associated with a plurality of services provided by a service provider;
 autonomously analyzing the collected data to identify any issues with provisioning one or more first services, among the plurality of services, to at least one first customer;

based on a determination that at least one first issue affects provisioning of at least one first service among the one or more first services, autonomously identifying one or more first automation actions to address the determined at least one first issue;

autonomously sending, using the automated services platform, one or more first instructions to one or more first automation bots, among a plurality of automation bots, to perform the identified one or more first automation actions; and generating and presenting, using the automated services platform, a user interface ("UI") on a user terminal associated with or operated by a user, the UI displaying information regarding at least one of the at least one first issue, the at least one first service affected by the at least one first issue, the identified one or more first automation actions for addressing the at least one first issue, or the one or more first automation bots for performing the one or more first automation actions, wherein determining that the at least one first issue affects provisioning of the at least one first service and identifying the one or more first automation actions to address the determined at least one first issue comprises:

comparing, using the automated services platform, the collected data with a plurality of sets of predetermined conditions stored in a second database together with corresponding plurality of automation actions; and determining, using the automated services platform, that at least one first collected data among the collected data matches at least one first set of predetermined conditions among the plurality of sets of predetermined conditions, wherein the at least one first set of predetermined conditions corresponds to the one or more first automation actions among the plurality of automation actions.

2. The method of claim 1, wherein the plurality of data sources comprises at least one of one or more network data sources, one or more network extended data sources, one or more customer data sources, one or more customer account data sources, one or more billing data sources, one or more dispatch data sources, one or more network tools, or one or more nodes disposed in at least one network via which at least one service among the plurality of services is provisioned.

3. The method of claim 1, wherein autonomously identifying the one or more first automation actions to address the determined at least one first issue comprises autonomously identifying, using the automated services platform, the one or more first automation actions from a plurality of automation actions contained within a library of automation actions that are stored in a first database, to address the determined at least one first issue.

4. The method of claim 1, further comprising:
collecting, using the automated services platform, updated data from each of the plurality of data sources;
comparing, using the automated services platform, at least one second collected data, among the updated data, with the at least one first set of predetermined conditions, the at least one second collected data being updated data of the at least one first collected data; and
determining, using the automated services platform, whether the at least one first issue has been resolved by the one or more first automation bots based at least in part on the comparison.

5. The method of claim 1, wherein autonomously analyzing the collected data to identify any issues with provisioning the one or more first services to the at least one first customer and autonomously identifying the one or more first automation actions to address the determined at least one first issue comprise:

sending, using the automated services platform, the collected data to a service action guidance engine ("SAGE");

autonomously analyzing, using the SAGE, the collected data to identify any issues with provisioning one or more first services, among the plurality of services, to the at least one first customer;

autonomously identifying, using the SAGE, the one or more first automation actions from a plurality of automation actions contained within a library of automation actions that are stored in a database, to address the determined at least one first issue; and sending, using the SAGE, the identified one or more first automation actions to the automated services platform.

6. The method of claim 5, wherein the collected data comprises data associated with provisioning services to all customers of the service provider, wherein the method further comprises:

autonomously analyzing, using the SAGE, the collected data to identify at least one of any common issues, any related issues, or any widespread issues with provisioning services, among the plurality of services, to a plurality of second customers of the service provider;

based on a determination that at least one second issue affects provisioning of at least one second service among the one or more second services, autonomously identifying one or more second automation actions to address the determined at least one second issue; and autonomously sending, using the automated services platform, one or more second instructions to one or more second automation bots, among the plurality of automation bots, to perform the identified one or more second automation actions.

7. The method of claim 5, wherein collecting data from each of the plurality of data sources comprises collecting data from each data source containing data directly associated with provisioning the one or more first services to the at least one first customer and from each data source containing data indirectly associated with provisioning the one or more first services, wherein the data indirectly associated with provisioning the one or more first services comprises at least one of data retrieved from an outage reporting system that collects outage data associated with provisioning the one or more first services, data associated with provisioning the one or more first services that has been posted via an application programming interface ("API") call by the outage reporting system, data associated with other customers in proximity to the at least one first customer, data associated with network nodes along potential network paths configured to provision the one or more first services, or data associated with services unassociated with the one or more first services yet indicative of geographical events, natural events, or events caused by humans that are determined to have a non-zero probability of affecting provisioning of the one or more first services to the at least one first customer.

8. The method of claim 1, wherein the one or more first automation bots comprise one of:

one or more first data sources, among the plurality of data sources, that collect first data that is indicative of the at least one first issue;

one or more second automation bots that are separate from the one or more first data sources that collect the first data, wherein the one or more second automation bots are identified subsequent to identifying the one or more first automation actions based on its capability of performing the identified one or more first automation actions; or
- one or more third automation bots that are separate from the one or more first data sources that collect the first data, wherein the one or more third automation bots are selected for performing the identified one or more first automation actions based on proximity to at least one of a source of the at least one first issue or a determined location for implementing the identified one or more first automation actions.

9. The method of claim 1, wherein the automated services platform manages connections, and communicates, with each of the plurality of data sources and with each of the plurality of automation bots, the plurality of data sources and the plurality of automation bots being disposed within one or more networks providing the one or more first services.

10. The method of claim 9, wherein at least one data source comprises at least one automation bot.

11. The method of claim 9, wherein managing connections, and communicating, with each of the plurality of data sources is performed via a first application programming interface ("API") between the automated services platform and each of the plurality of data sources, wherein managing connections, and communicating, with each of the plurality of automation bots is performed via a second API between the automated services platform and each of the plurality of automation bots.

12. The method of claim 11, wherein collecting data from each of the plurality of data sources comprises collecting data from each of the plurality of data sources via an orchestration system, wherein autonomously sending the one or more first instructions to the one or more first automation bots comprises autonomously sending the one or more first instructions to the one or more first automation bots via the orchestration system, wherein the first API communicatively couples the orchestration system with each of the plurality of data sources, wherein the second API communicatively couples the orchestration system with each of the plurality of automation bots, wherein a third API communicatively couples the orchestration system with the automated services platform, and wherein a fourth API communicatively couples the automated services platform with the user terminal.

13. The method of claim 9, further comprising:
- monitoring and tracking, using the automated services platform, success rates and failure rates of each of the plurality of automation bots based at least in part on analysis of one or more of updated collected data or data directly collected from each of the plurality of automation bots.

14. The method of claim 1, wherein collecting data from each of the plurality of data sources is performed at least one of continuously, periodically, randomly, or in response to a request to collect data, wherein the method further comprises:
- autonomously analyzing, using the automated services platform, updated collected data that is collected after the identified one or more first automation actions have been performed, to determine whether the identified one or more first automation actions have resolved the at least one first issue; and
- based on a determination that the at least one first issue has not been resolved by the identified one or more first automation actions, determining, using the automated services platform, one or more first non-automation actions to address the at least one first issue, wherein the one or more first non-automation actions comprise at least one of remote tasks requiring actuation or selection by the user via one or more generated first options in the UI, user-controlled remote reconfiguration of nodes for provisioning the at least one first service via one or more generated second options in the UI, or dispatching of field technicians to physically diagnose and resolve the at least one first issue via one or more generated third options in the UI.

15. The method of claim 1, further comprising:
- generating and presenting, using the automated services platform, an administration platform UI within the UI, the administration platform UI displaying to the user at least one of one or more fourth options for configuring or reconfiguring one or more automation actions among a plurality of automation actions or one or more fifth options for configuring or reconfiguring one or more automation bots among the plurality of automation bots.

16. The method of claim 1, wherein the automated services platform comprises at least one of a service diagnostics computing system, a service provisioning computing system, a service management computing system, a call center computing system, a server computer, a webserver, a cloud computing system, or a distributed computing system.

17. The method of claim 1, wherein the user comprises one of a call center user associated with the service provider, a field technician associated with the service provider, or the at least one first customer.

18. The method of claim 1, wherein the UI is generated and presented via a web portal to which the user is logged in.

19. A system, comprising:
- a plurality of data sources;
- a plurality of automation bots; and
- at least one computing system, each comprising:
  - at least one first processor; and
  - a first non-transitory computer readable medium communicatively coupled to the at least one first processor, the first non-transitory computer readable medium having stored thereon computer software comprising a first set of instructions that, when executed by the at least one first processor, causes the at least one computing system to:
- collect data from each of the plurality of data sources, the collected data being associated with a plurality of services provided by a service provider;
- autonomously analyze the collected data to identify any issues with provisioning one or more first services, among the plurality of services, to at least one first customer;
- based on a determination that at least one first issue affects provisioning of at least one first service among the one or more first services, autonomously identify one or more first automation actions to address the determined at least one first issue;
- autonomously send one or more first instructions to one or more first automation bots, among the plurality of automation bots, to perform the identified one or more first automation actions; and
- generate and present a user interface ("UI") on a user terminal associated with or operated by a user, the UI displaying information regarding at least one of the at least one first issue, the at least one first service affected by the at least one first issue, the identified one or more first automation actions for addressing the at least one first issue, or the one or more first automation bots for performing the one or more first automation actions wherein determining that the at least one first issue affects provisioning of the at least one first service and identifying the one or more first automation actions to address the determined at least one first issue comprises:

comparing, by the at least one computing system, the collected data with a plurality of sets of predetermined conditions stored in a second database together with corresponding plurality of automation actions; and determining, by the at least one computing system, that at least one first collected data among the collected data matches at least one first set of predetermined conditions among the plurality of sets of predetermined conditions, wherein the at least one first set of predetermined conditions corresponds to the one or more first automation actions among the plurality of automation actions.

20. The system of claim 19, wherein the at least one computing system comprises at least one of an automated services platform, a service action guidance engine ("SAGE"), a service diagnostics computing system, a service provisioning computing system, a service management computing system, a call center computing system, a server computer, a webserver, a cloud computing system, or a distributed computing system.

* * * * *